(12) United States Patent
Seth et al.

(10) Patent No.: US 11,671,309 B2
(45) Date of Patent: Jun. 6, 2023

(54) ASYNCHRONOUS SOCKET REPLICATION BETWEEN NODES OF A NETWORK

(71) Applicant: Juniper Networks, Inc., Sunnyvale, CA (US)

(72) Inventors: Sameer Seth, Bangalore (IN); Ananda Kumar M R, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/661,698

(22) Filed: May 2, 2022

(65) Prior Publication Data
US 2022/0263706 A1 Aug. 18, 2022

Related U.S. Application Data

(63) Continuation of application No. 17/248,216, filed on Jan. 14, 2021, now Pat. No. 11,323,309.

(51) Int. Cl.
| | | |
|---|---|---|
| *G06F 11/00* | (2006.01) | |
| *H04L 41/0654* | (2022.01) | |
| *H04L 45/58* | (2022.01) | |
| *H04L 45/60* | (2022.01) | |
| *H04L 45/28* | (2022.01) | |

(52) U.S. Cl.
CPC .......... *H04L 41/0654* (2013.01); *H04L 45/28* (2013.01); *H04L 45/58* (2013.01); *H04L 45/60* (2013.01)

(58) Field of Classification Search
CPC ......... H04L 45/28; H04L 45/60; H04L 45/58; H04L 41/0654
See application file for complete search history.

(56) References Cited

U.S. PATENT DOCUMENTS

| | | | | |
|---|---|---|---|---|
| 7,499,394 | B2 * | 3/2009 | Visser | H04L 45/28 |
| | | | | 370/392 |
| 7,751,311 | B2 | 7/2010 | Ramaiah et al. | |
| 7,940,650 | B1 * | 5/2011 | Sandhir | H04L 45/28 |
| | | | | 370/219 |
| 8,050,559 | B2 | 11/2011 | Sindhu | |

(Continued)

FOREIGN PATENT DOCUMENTS

| | | |
|---|---|---|
| CN | 102572994 A | 7/2012 |
| CN | 103210669 A | 7/2013 |

(Continued)

OTHER PUBLICATIONS

Extended Search Report from counterpart European Application No. 21167428.8 dated Oct. 6, 2021, 9 pp.

(Continued)

*Primary Examiner* — Richard G Keehn
(74) *Attorney, Agent, or Firm* — Shumaker & Sieffert, P.A.

(57) ABSTRACT

An example network device includes a primary node and a standby node. The primary node engages in a routing session with a peer network device via a connected socket. The standby node includes one or more processors implemented in circuitry and configured to execute a backup replication module to receive, from the primary node, data to be written to a backup socket for the connected socket, and, in response to a switchover, to send a representation of the data to the peer network device via the backup socket.

17 Claims, 12 Drawing Sheets

(56) References Cited

U.S. PATENT DOCUMENTS

| | | | |
|---|---|---|---|
| 9,077,617 B1 * | 7/2015 | Seth | H04L 45/28 |
| 9,198,203 B2 | 11/2015 | Shaffer et al. | |
| 9,491,107 B1 * | 11/2016 | Scudder | H04L 45/28 |
| 10,291,750 B1 | 5/2019 | Seth et al. | |
| 11,323,309 B1 | 5/2022 | Seth et al. | |
| 2002/0167952 A1 | 11/2002 | Watson et al. | |
| 2006/0198296 A1 | 9/2006 | Majee et al. | |
| 2008/0291906 A1 | 11/2008 | Chigurupati et al. | |
| 2009/0228970 A1 | 9/2009 | Morimoto | |
| 2009/0268747 A1 | 10/2009 | Kurata et al. | |
| 2017/0070444 A1 | 3/2017 | Dhanabalan et al. | |

FOREIGN PATENT DOCUMENTS

| | | | |
|---|---|---|---|
| CN | 103532841 A | 1/2014 | |
| CN | 108462637 A | 8/2018 | |
| CN | 110958176 A | 4/2020 | |

OTHER PUBLICATIONS

Notice of Allowance from U.S. Appl. No. 17/248,216, dated Mar. 2, 2022, 9 pp.

Office Action from U.S. Appl. No. 17/249,725, dated Mar. 31, 2022, 5 pp.

Response to Office Action dated Mar. 31, 2022 from U.S. Appl. No. 17/249,725, filed Jul. 21, 2022, 7 pp.

U.S. Appl. No. 15/806,625, filed Nov. 8, 2017, naming inventors Seth et al.

U.S. Appl. No. 17/249,725, filed Mar. 10, 2021, naming inventors Seth et al.

Notice of Allowance from U.S. Appl. No. 17/249,725 dated Oct. 27, 2022, 8pp.

Response to Extended Search Report dated Oct. 6, 2021, from counterpart European Application No. 21167428.8 filed Jan. 13, 2023, 30 pp.

Furong, "The Communication of Process Based on Stream Socket of Winsock", Journal of Xi an University of Arts & Science, vol. 13, No. 2, Apr. 2010, pp. 81-84.

Office Action, and summary translation thereof, from counterpart Chinese Application No. 202110371056.8, dated Feb. 24, 2023, 15 pp.

* cited by examiner

ASYNCHRONOUS SOCKET REPLICATION BETWEEN NODES OF A NETWORK

RELATED APPLICATION

This application is a continuation of U.S. application Ser. No. 17/248,216, filed Jan. 14, 2021, the entire content of which is herein incorporated by reference.

TECHNICAL FIELD

This disclosure relates to computer networks and, more particularly, to network devices, such as routers, that perform a switchover from a primary control unit to a secondary control unit.

BACKGROUND

A computer network is a collection of interconnected computing devices that can exchange data and share resources. Certain devices within the computer network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Upon receiving an incoming packet, the router examines information within the packet to identify the destination for the packet. Based on the destination, the router forwards the packet in accordance with the forwarding information.

Large computer networks, such as the Internet, often include many routers that exchange routing information according to a defined routing protocol, such as the Border Gateway Protocol (BGP). When two routers initially connect, the routers exchange routing information and generate forwarding information from the exchanged routing information. Particularly, the two routers initiate a routing communication "session" by which they exchange routing information according to the defined routing protocol. The routers continue to communicate via the routing protocol to incrementally update the routing information and, in turn, update their forwarding information in accordance with changes to a topology of the network indicated in the updated routing information. For example, the routers may send update messages to advertise newly available routes or routes that are no longer available.

In the event one of the routers of a routing session detects a failure of the session, i.e., the session "goes down," the surviving router may select one or more alternative routes through the network to avoid the failed router and continue forwarding packet flows. In particular, the surviving router may update internal routing information to reflect the failure, perform route resolution based on the updated routing information to select one or more alternative routes, update its forwarding information based on the selected routes, and send one or more update messages to inform peer routers of the routes that are no longer available. In turn, the receiving routers update their routing and forwarding information, and send update messages to their peers. This process continues and the update information propagates outward until it reaches all of the routers within the network. Routing information in large networks may take a long period of time to converge to a stable state after a network fault due to temporary oscillations, i.e., changes that occur within the routing information until it converges to reflect the current network topology. These oscillations within the routing information are often referred to as "flaps," and can cause significant problems, including intermittent loss of network connectivity and increased packet loss and latency.

To reduce the impact of failures, some routers include a primary routing control unit and a secondary routing control unit. In the event the primary routing control unit fails, for example, the secondary routing control unit assumes the responsibility of forwarding packet flows. During a switchover from the primary routing control unit to the secondary routing control unit, a significant period of time may elapse before the secondary routing control unit reaches a state in which it is able to process and forward packets. For example, the secondary routing control unit may need to reestablish routing sessions, e.g., BGP sessions, that were lost when the primary routing control unit failed. During this period, network traffic may be queued or lost.

SUMMARY

In general, this disclosure describes techniques for enabling non-stop routing and graceful switchover between primary and backup nodes (e.g., control units) of a network device by way of L4 (Transport Layer) connections with high availability. To maintain high availability, socket replication is performed between primary and standby routing control units. Data (e.g., routes) loss is prevented because the standby routing control unit stores a backup copy of each inbound/outbound packet. Before data in an inbound/outbound packet is processed by an appropriate application (e.g., a routing process) or a protocol stack for transmission, the primary routing control unit sends that replicated data to the standby routing control unit. In the primary routing control unit and/or the standby routing control unit, a replication module hooks a protocol stack layer to intercept data flowing in either direction to make sure the standby routing control unit has an up-to-date state of a backup socket that is pre-established to resume a routing session of the primary routing control unit.

The systems and techniques described herein mitigate latencies in conventional socket data replication by reducing/eliminating a wait time for an explicit acknowledgment from the standby routing control unit in response to the replicated data. Some systems and techniques rely on a L4 (Transport Layer) socket acknowledgment to assume the standby routing control unit successfully received the replicated data and/or updated a backup routing information base (RIB). In the event of a failure at the primary routing control unit, the standby routing unit takes control of routing and forwarding decisions with little or no interruption.

Some socket data replication techniques rely on a Transmission Control Protocol (TCP) socket of an operating system to return a TCP socket acknowledgement (e.g., TCP ACK) in response to a socket message in accordance with TCP. This is because the operating system (e.g., automatically) returns the TCP socket acknowledgement to acknowledge receipt of the socket message whereas the standby routing control unit returns the explicit acknowledgment only after that the replicated data has been read by an application and used to update the RIB. As such, non-stop routing and graceful switchover may be enabled.

In one example, a method includes generating, by a replication module of a standby node for a primary node in a network, a backup socket using information corresponding to a connected socket at the primary node of the network, wherein the information comprises a transport layer state of the connected socket, wherein the connected socket at the primary node provides network communication connectivity between the primary node and a peer network device in accordance with a transport layer protocol, wherein the backup socket of the standby node is configured to provide network communication connectivity between the standby node and the peer network device after a switchover from the primary node; and in response to the switchover, retrieving, by the replication module, a portion of a send buffer of the backup socket in accordance with the transport layer state of the connected socket, wherein the send buffer comprises a sequence of data blocks written to the connected socket by the primary node, wherein the transport layer state of the connected socket comprises information identifying the portion of the send buffer comprising at least one next data block to be transmitted to the peer network device from the primary node at a time of the switchover, and sending, by the replication module, the at least one next data block to the peer network device via the backup socket.

In another example, a network device includes a primary node and a standby node. The primary node includes one or more processors implemented in circuitry and configured to execute an operating system providing an application space and a kernel space; execute a replication application in the application space to receive a data write operation including data to be written to a socket of the operating system or to receive a data read operation requesting data to be read by a routing process.

In another example, a network comprising at least one network device, the network comprising: a standby node configured on a network device to resume a routing session of a primary node in event of a switchover, wherein the primary node and the standby node are configured on same network device or different network devices of the network, wherein standby node comprises one or more processors implemented in circuitry and configured to: execute a replication module to: generate a backup socket using information corresponding to a connected socket at the primary node of the network, wherein the information comprises a transport layer state of the connected socket, wherein the connected socket at the primary node provides network communication connectivity between the primary node and a peer network device in accordance with a transport layer protocol, wherein the backup socket of the standby node is configured to provide network communication connectivity between the standby node and the peer network device after the switchover from the primary node; and in response to the switchover, retrieve a portion of a send buffer of the backup socket in accordance with the transport layer state of the connected socket, wherein the send buffer comprises a sequence of data blocks written to the connected socket by the primary node, wherein the transport layer state of the connected socket comprises information identifying the portion of the send buffer comprising at least one next data block to be transmitted to the peer network device from the primary node at a time of the switchover, and send the at least one next data block to the peer network device via the backup socket.

In another example, a computer-readable storage medium having stored thereon instructions that, when executed, cause one or more processors of a primary node of a network device to: execute an operating system to provide an application space and a kernel space; execute logic in the kernel space, the logic operative to: generate a backup socket using information corresponding to a connected socket at a primary node of the network, wherein the information comprises a transport layer state of the connected socket, wherein the connected socket at the primary node provides network communication connectivity between the primary node and a peer network device in accordance with a transport protocol, wherein the standby node is configured to provide control for the network device after a failure of the primary node, wherein the backup socket provides network communication connectivity between the standby node and the peer network device after the failure of the primary node; and in response to the failure, retrieve a portion of a send buffer of the backup socket in accordance with the transport layer state of the connected socket, wherein the send buffer comprises a sequence of data blocks written to the connected socket by the primary node, wherein the transport layer state of the connected socket comprises information identifying the portion of the send buffer comprising at least one next data block to be transmitted to the peer network device from the primary node at a time of the failure, and send the at least one next data block to the peer network device via the backup socket.

The details of one or more examples are set forth in the accompanying drawings and the description below. Other features, objects, and advantages will be apparent from the description and drawings, and from the claims.

DETAILED DESCRIPTION

Figure 1:
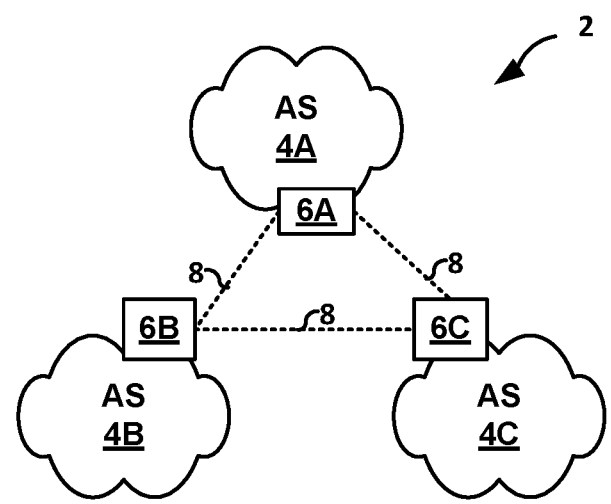
FIG. 1 illustrates an example computing network formed by autonomous systems interconnected by communication links.

FIG. 1 illustrates an example computing network 2 formed by autonomous systems 4A-4C (herein autonomous systems 4) interconnected by communication links 8. Each of autonomous systems 4 represents an independent administrative domain having a variety of networked resources capable of packet-based communication. For example, autonomous systems 4 may include internal networks having servers, workstations, network printers and faxes, gateways, routers, and the like. In this example, autonomous systems 4 include autonomous system border routers (ASBRs) 6 for sharing routing information and forwarding packets via communication links 8. That is, routers 6 maintain peer routing sessions and exchange messages conveying routing information in accordance with a routing protocol, such as the Border Gateway Protocol (BGP). The messages communicated over the routing sessions typically advertise and withdraw routes for reaching destinations within network 2. In the event of a network topology change, such as link failure or failure of one of routers 6, any of the routers detecting the change issue routing messages (e.g., route advertisements) informing the other routers of the affected routes. In response, routers 6 select new routes for reaching the destinations within network 2.

In order to mitigate the effects on node failure, one or more of routers 6 incorporate a primary routing engine and one or more secondary routing engines to assume routing responsibilities in the event the primary routing engine fails. Moreover, as described herein, one or more of routers 6 provide non-stop routing after graceful switchover from the primary routing engine to one of the secondary routing engines using replication of routing sessions. That is, data for sockets associated with the routing sessions on the primary routing engine is transparently replicated to the secondary routing engine in real-time (i.e., while the primary routing engine exchanges routing messages) prior to any switchover event. The secondary routing engine constructs and maintains backup sockets so as to mimic the (connected) sockets currently used by the primary routing engine when communicating with the other routers 6.

During a switchover from the primary routing engine to the secondary routing engine, the pre-established (e.g., pre-connected) backup sockets on the secondary routing engine contain all the information needed to preserve the connections with the routing peers; these sockets enable the routing communications sessions to continue uninterrupted such that these connections need not be reestablished. This information may include any outbound/inbound data queued in the connected socket buffer and information describing a state (e.g., a transport layer state) of that socket. The state of the connected socket at the primary routing engine identifies which outbound data blocks (e.g., bytes) have been written to the connected socket and then, replicated to the backup socket and communicated to a peer network device but have not been acknowledged by that peer network device (i.e., unacknowledged data blocks). Based on the unacknowledged data block(s), the state of the connected socket identifies which data blocks are next to be sent to the peer network device (i.e., send next data blocks). When (due to the switchover) the secondary routing engine assume control over the routing sessions from the primary routing engine, the secondary routing engine (in accordance with the state of the connected socket) communicates one or more send next data blocks in continuance of the routing sessions without lagging behind the primary routing engine. Because of the secondary routing engine maintains an up-to-date state of the connected socket, the secondary routing engine avoids communicating data that the primary routing already transmitted prior to the switchover; the secondary routing engine starts transmitting data where the primary routing engine left off with respect to transmitting data for the routing sessions. Hence, the switchover to the secondary routing engine is seamless, and to the peer network device, there isn't a substantial delay between the primary routing engine's last transmission and the secondary routing engine's first transmission.

As described herein, these techniques provide non-stop routing from multiple network devices in a network or a single network device in that network and enable a graceful switchover that seamlessly transfers control over a routing session from the primary routing engine to the secondary routing engine. As further described herein, these techniques facilitate messaging-free socket replication by replicating data via a first transport layer connection (e.g., a replication socket) between the primary routing engine and the secondary routing engine and then, automatically pushing data onto a protocol stack—which prepares and schedules the data for communication to the peer network device via a second transport layer connection (e.g., the connected socket)—as a response to receiving a socket acknowledgment. Instead of an explicit acknowledgement, these techniques rely on the socket acknowledgement to function as a provisional confirmation that the replicated data has been stored in a memory buffer of a third transport layer connection (e.g., the pre-connected or backup socket). The socket acknowledgement is an example acknowledgement message that has been assembled in accordance with a transport layer protocol and represents the third transport layer connection acknowledgement that the replicated data arrived at the secondary routing engine. An example transport layer protocol is Transmission Control Protocol (TCP) but the present disclosure is applicable to any suitable protocol that ensuring delivery of communicated data, for example, by mapping a sequence of data blocks to an address space (e.g., sequence numbers).

Conventional socket replication techniques are limited to synchronous socket replication and for that reason, require that the primary routing engine halt the communication to the peer network device and wait for the explicit acknowledgement from the secondary routing engine before pushing any replicated data onto the protocol stack. Waiting for the explicit acknowledgement may result in significant latencies in the routing sessions. Some of the techniques described herein decouple the routing sessions and the socket replication tasks at the primary routing engine improves overall performance of that primary routing engine. To provide asynchronous socket replication without affecting the graceful switchover to and the non-stop routing from the secondary routing engine, some of the techniques described herein leverage the information describing the state (e.g., a TCP state) of the pre-connected socket of the third transport layer connection.

As described herein, some techniques may be implemented without requiring changes to networking protocols. In this manner, the techniques provide for asynchronous and peer-agnostic socket replication.

It should be noted that the present disclosure may refer to an example secondary routing engine as a backup or standby node and an example primary routing engine as a primary or primary node within a network. Depending on context regarding the network, a node may refer to a routing engine that shares a network device with another routing engine or a network device that operates as a single routing engine.

For purposes of example, the techniques of this disclosure are described with reference to router 6A and, in some instances, router 6B. However, router 6C may operate in accordance with the techniques described herein. In this example, router 6A and/or router 6B provides non-stop routing by including a primary routing engine as well as one or more standby routing engines. As described herein, router 6A may be a network device that includes both the primary and secondary routing engines, or router 6A and router 6B may represent the primary and secondary routing engines, respectively, as part of separate network devices. In the event of a graceful switchover, i.e., when the primary routing engine of router 6A fails or otherwise needs to be shut down, one of the secondary routing engines assumes control over routing resources and routing functionality generally. Prior to the switchover, the primary and secondary routing engines synchronize information corresponding to their respective states to allow the secondary routing engine to assume control of the routing resources without having to relearn state information. Moreover, a corresponding socket is pre-established on the secondary routing engine for each socket currently in use by the primary routing engine for routing sessions.

For example, router 6A may engage in a routing session with, e.g., router 6C using a socket (e.g., a connected socket). Router 6A and router 6C, a peer network device, may exchange session messages over the connected socket in accordance with a routing protocol, such as BGP. When router 6A receives a message from router 6C, the message may be internally forwarded to the primary routing engine of router 6A for processing. At some point between reception and acknowledgment, a replication module (on behalf of the primary routing engine) is configured to replicate the received message and then, send to the secondary routing engine of router 6A via a replication socket. In some examples, the replication module in the primary routing engine generates a data unit in accordance with a transport protocol of the second socket, such as TCP and then, communicates that data unit with the received message (e.g., in its payload). With respect to outbound messages, when router 6A generates a message for communication to router 6C via the connected socket, the replication module of the primary routing engine is configured to replicate the message to be sent and then, send that replicated message to the secondary routing engine via the replication socket. In some examples, router 6A generates a composite message configured to store (e.g., in its payload) the replicated message with state information corresponding to the connected socket.

Similarly, router 6B may engage in a routing session with, e.g., router 6C using a second connected socket in accordance with a transport protocol. With respect to inbound routing messages, when router 6B receives a message from router 6C, the message may be internally forwarded to the primary routing engine of router 6B for processing. At some point between reception and acknowledgment, a replication module (on behalf of the primary routing engine at router 6B) replicates the received message and then, sends that replicated message to the secondary routing engine running in router 6A via the second replication socket. When router 6B generates a message for communication to router 6C via the socket, the replication module replicates the message to be sent and then, sends that message to the secondary routing engine via the second replication socket.

In response to receiving inbound or outbound messages via the replication socket or the second replication socket, a backup or standby replication module in the secondary routing engine updates state information (e.g., TCP state information) for a backup socket that provides network communication connectivity to router 6C. The backup socket corresponds to the connected socket of the primary routing engine at router 6A or the second connected socket of the primary routing engine at router 6B. In either example, once the secondary routing engine configures the backup socket, a signal (e.g., a keepalive signal) may be automatically enabled with the primary routing engine in either router 6A or the primary routing engine in router 6B. For the backup socket, the secondary routing engine updates at least two memory buffers (e.g., receive buffer and sent buffer) within received inbound and outbound message data, respectively. The data blocks in these buffers have been written to a socket (e.g., a replication socket in accordance with TCP) that provides network communication connectivity with a particular primary routing engine. The secondary routing engine writes the data blocks as enumerated sequences in the buffers and records a sequence number of a last written block as part of the state of the backup socket. A portion of the outbound message data blocks has not yet been sent and another portion has not been acknowledged (e.g., by way of a received acknowledgement); by recording respective sequence numbers for these portions, the secondary routing engine (e.g., in a single operation) retrieve data blocks of either portion from their corresponding memory buffers.

By taking advantageous use of an eavesdropping mechanism (e.g., a hook, such as a Netfilter hook as explained herein) at both primary routing engine, the secondary routing engine is notified of up-to-date socket state changes for replication to the backup socket. In some examples, the secondary routing engine of router 6A, via the eavesdropping mechanism, listens for the inbound messages or outbound messages being received and sent at the corresponding transport protocol layer by the particular primary routing engine (e.g., at router 6A or router 6B). This layer of the protocol stack processes outbound message data after the routing protocol (e.g., application layer), and for at least that reason, the secondary routing engine may assume that the primary routing engine processed the message (e.g., and in turn, updated routing and forwarding information bases). The transport protocol of the protocol stack may be hooked to update the secondary routing engine of sent data contemporaneous to their sending. The transport layer of the protocol stack processes inbound message data after a network layer and therefore, may be hooked update the secondary routing engine with accurate and current acknowledgements. The replication module (on behalf of the secondary routing engine) generates data identifying one or more data blocks of outbound message data that are unacknowledged by the router 6C and data identifying one or more data blocks of the same outbound message data that are not yet sent to router 6C.

As described herein, the eavesdropping mechanism enables the secondary routing engine to maintain an updated socket state (e.g., a transport protocol layer state) of the backup socket in the event of a switchover such that the secondary routing engine seamlessly assumes primary role. The secondary routing engine, by way of the eavesdropping mechanism, intercepts incoming acknowledgment messages and replicates, to the state backup socket, acknowledged sequences numbers such that (with trivial latency) the socket state remains up-to-date and (mostly) current with the connected socket or the second connected socket of the primary routing engine. The secondary routing engine records a sequence number after a last acknowledged data block as a starting point of a sequence of unacknowledged data blocks. In this manner, the secondary routing engine avoids retransmitting acknowledged data and prevents router 6A from lagging. As another advantageous use of the eavesdropping mechanism, the secondary routing engine intercepts outbound routing messages at the transport layer of the protocol stack of the primary routing engine. The secondary routing engine records a sequence number of a data block after a last sent data block by the primary routing engine. In this manner, the secondary routing engine automatically resumes routing sessions with router 6C (with zero latency) in response to a switchover and/or while the primary routing engine is down. The secondary routing engine quickly identifies each next data block to be sent to router 6C and prepares data units (e.g., packets) for communication to router 6C in continuation of the routing session with the primary routing engine.

Regardless of any switchover, data blocks storing inbound/outbound messages (e.g., routing messages) that have been processed by the transport layer of the protocol stack at the secondary routing engine and written to a corresponding send or receive buffer of the backup socket are (eventually) read by applications (e.g., an application layer). A routing protocol process at the secondary routing engine may invoke read operations requesting unread data, and in response, the replication module generates an interprocess communication with the requested data blocks. The routing protocol process updates various databases storing routing information (e.g., routing information base (RIB) and forwarding information (e.g., forwarding information base (FIB)) in preparation of the switchover such that packet forwarding engine may properly forward packets to internal destinations within the autonomous system or to external destinations in a different autonomous system.

Hence, based on the updated state information, the secondary routing engine continues routing messages for each session with router 6C without a significant interruption to packet forwarding. Even after the switchover to the backup socket of the secondary routing engine, when an inbound/outbound message is processed by a (secondary) protocol stack at router 6A, the replication module updates the data identifying one or more data blocks of the sent buffer that are unacknowledged by the router 6C and the data identifying one or more data blocks of the same sent buffer that are not yet sent to router 6C.

In other examples, the primary routing engine of router 6A may send replicated data (e.g., in an outgoing TCP segment or another data unit according to a transport layer protocol) to the secondary routing engine before that data is processed by the protocol stack (e.g., a transport layer) for the socket on the primary routing engine. For example, the replication module at the primary routing engine may replicate and communicate data to the secondary routing engine, for example, before an outbound message is packaged into a transport layer protocol data unit (when sending data) by the protocol stack (e.g., the transport layer) or before an inbound message is unpacked from a transport layer protocol data unit (when receiving data) by the protocol stack (e.g., by the transport layer). In the present disclosure, the transport layer protocol data unit may be known as a TCP segment or packet. As another example, the replication module at the primary routing engine may replicate and communicate data to the secondary routing engine after an outbound message is packaged into a data unit (e.g., a TCP segment or IP packet) by the protocol stack (e.g., the transport layer) and/or after an inbound message is unpacked by the protocol stack (e.g., the transport layer). As further illustrated below, this asymmetric/asynchronous replication of data for routing messages at different levels of the networking stack aids router 6A in ensuring that the state of the corresponding backup socket on the secondary routing engine matches that of the connected (e.g., active) socket of the primary routing engine.

In the event that the primary routing engine of router 6A goes down, for example as a result of a failure or because software of the primary routing engine is to be updated, the secondary routing engine detects the event (e.g., by way of heartbeat/keepalive signal or explicit message from the primary) and resumes control of the primary's routing functionality. Because the secondary routing engine has received all of the data that the primary routing engine has sent and received, the secondary routing engine may be able to continue the communication session without the necessity of a session restart. This data includes socket data replication (e.g., replication of inbound and outbound data) between different routing engines in a same network device or different routing engines in different network devices.

Both the primary routing engine and the secondary routing engine employ a state machine (e.g., TCP state machine) to maintain a state (e.g., TCP state) of a highly available pair of sockets and their underlying redundant connections (e.g., TCP connections) with a peer network device. For example, the secondary routing engine may keep track of sequence numbers of sent data and received data including acknowledgements for the corresponding socket. The secondary routing engine may also buffer the sent data such that, if the primary routing engine fails before at least a portion the sent data is pushed to the protocol stack and actually transmitted, the secondary routing engine may start transmitting that portion of the sent data. Starting with a first data block immediately succeeding a last sent data block that has been successfully placed on a wired/wireless connection, the secondary routing engine routes messages for the benefit of the primary routing engine's session routing messages. Furthermore, if the primary routing engine fails at a time when the sent data is not received by the peer network device recipient (as determined by whether the secondary routing engine has received an acknowledgement), the secondary routing engine may wait for the acknowledgement before and/or instead of retransmitting the data after taking control of routing duties.

The primary routing engine and/or the secondary routing engine may also map each byte of the sent data buffer to send (byte) sequence numbers (e.g., TCP send sequence numbers). By piggybacking socket replication with the TCP state of the underlying connection, the techniques described herein enable asynchronous socket data replication in a manner that may be more efficient than other socket replication techniques. For incoming data, the primary routing engine updates the TCP state in the TCP state machine for the corresponding socket as (e.g., after) the packet traverses the protocol stack, and in turn, the secondary routing engine updates the TCP state in the TCP state machine of the corresponding replicated socket. For outgoing data, the primary routing engine replicates the outgoing data to the secondary routing engine, and when an acknowledgement from a peer is received, the secondary routing engine identifies at least a portion of the outgoing data that maps to the acknowledgement and may follow that identification by removing that portion from memory. For both outgoing data and incoming data, the primary routing engine transmits, by way of an out-of-band communication (e.g., an inter-process communication (IPC) by a hooked protocol stack), current and/or updated TCP state data, upon receiving acknowledgments from the peer network device. For outgoing data, the primary routing engine replicates the sent data buffer to the secondary routing engine before pushing the send buffer through the protocol stack and then, packaging the sent data buffer as a TCP segment (or another protocol data unit). The secondary routing engine does not update the TCP state of the TCP machine until the TCP acknowledgement from the peer is received.

Furthermore, according to the techniques of this disclosure, the primary routing engine may be configured to replicate state information (e.g., socket data) to the secondary routing engine without relying on kernel-level enhancements, thus enabling graceful failover including socket data replication without requiring modification to an underlying kernel of an operating system of the primary routing engine. That is, the primary routing engine may be configured with a user-space replication application that intercepts socket calls, a new kernel-level module that operates separate from existing kernel software and is invoked by the replication application for replicating socket data to the secondary routing engine. When the socket layer of the operating system of the primary routing engine receives data from a peer (e.g., router 6B) or an application (e.g., a routing process), the kernel module intercepts the data and replicates this data to the secondary routing engine. After receiving an acknowledgement from the secondary routing engine, the kernel module proceeds to process the data. In general, the kernel module may include three parts: a kernel thread to process data for replication, a device driver (e.g., a Linux or Unix character driver or the like) to intercept socket data from an application (e.g., the routing process), and functionality for socket receive data event interception and event processing.

The techniques described herein may provide certain advantages. For example, router 6A may be able to perform graceful switchover between routing engines, thereby achieving non-stop routing. In the event of a failure or other need to bring down the primary routing engine, router 6A may be able to continue to forward packets without downtime and in a manner that avoid routing session reestablishment, thus avoiding route flapping by peer routers. Similarly, these techniques may enable a router to receive in-service software upgrades without causing route flapping. For example, when a software upgrade is necessary for the router, a system administrator may take the secondary routing engine offline to receive and install the upgrade.

Moreover, router 6A may perform socket replication transparently to outside network devices, such as routers 6B-6C, because no modification to existing communication protocols is necessary. Routers 6B-6C need not change their behavior with respect to the routing protocols used when communicating with peer network devices in order for router 6A to implement socket replication and non-stop routing. Moreover, routers 6B-6C need not have any indication of the fact that router 6A is configured to perform switchover.

Figure 2:
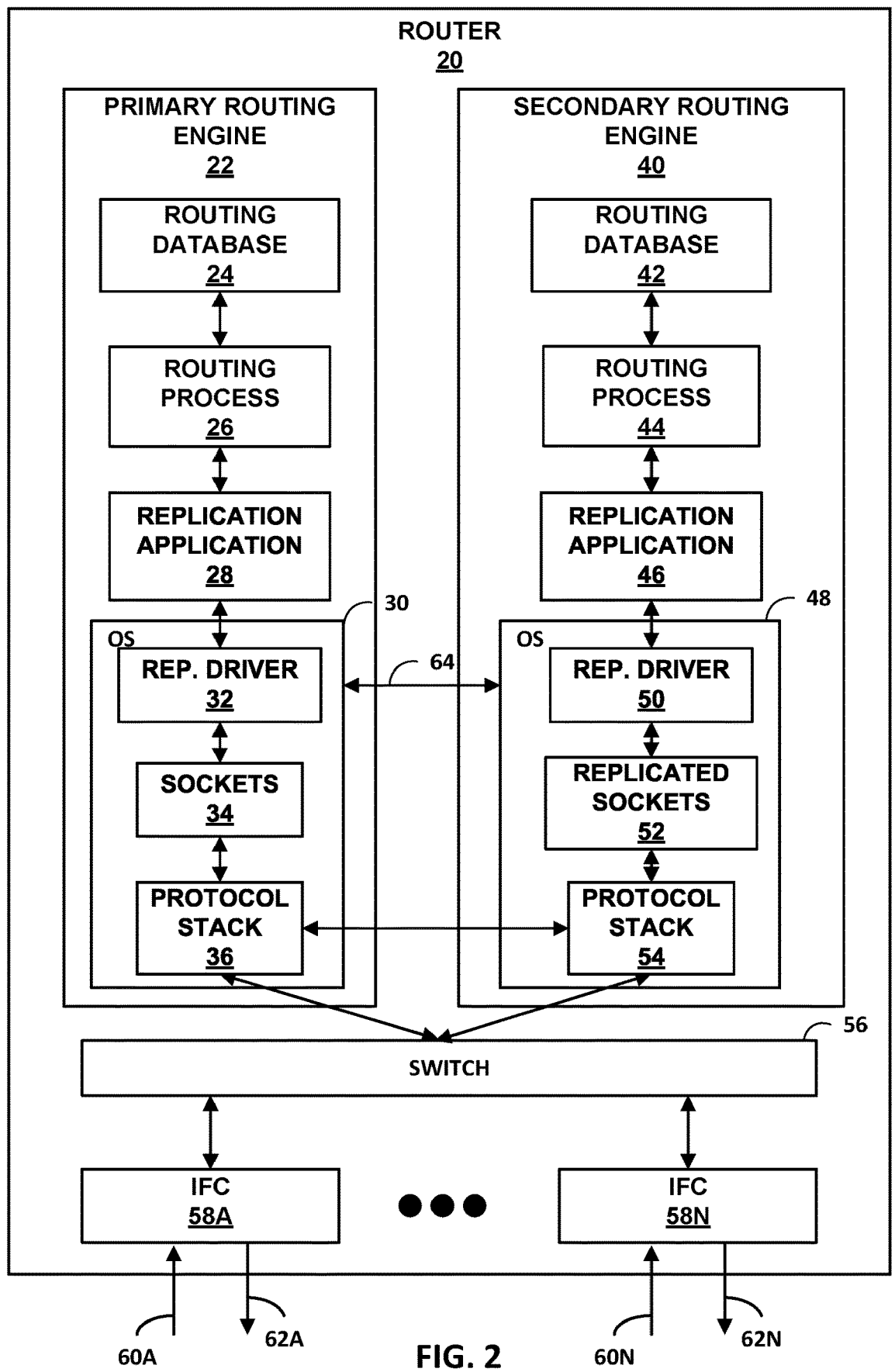
FIG. 2 is a block diagram illustrating an example router capable of performing a switchover from a primary routing engine to a secondary routing engine using the techniques of this disclosure.

FIG. 2 is a block diagram illustrating an example router 20 capable of performing a graceful switchover from primary routing engine 22 to a secondary routing engine 40 using the techniques described herein. Router 20 may, for example, correspond to router 6A of FIG. 1.

In the example embodiment of FIG. 2, router 20 includes primary routing engine 22 and secondary routing engine 40. In this manner, router 20 may be viewed as having a primary control unit and a backup control unit. Primary routing engine 22 is responsible for maintaining routing database 24 to reflect the current topology of a network and other network entities to which router 20 is connected. That is, primary routing engine 22 provides an operating environment for execution of a routing process (daemon) 26 that implements one or more routing protocols to communicate with peer routers and periodically update routing database 24 to accurately reflect the topology of the network and the other network entities. Example protocols include routing and label switching protocols, such as BGP, MP-BGP, IS-IS, OSPF, RIP, RSVP-TE and LDP. In a similar fashion, secondary routing engine 40 provides an operating environment for maintaining routing database 42 in accordance with data received from primary routing engine 22. Alternatively, the techniques described herein may be applied between a routing engine of a first router (e.g., router 6A of FIG. 1) and a routing engine of a second router (e.g., router 6B of FIG. 1). That is, a routing engine of router 6A may act as a primary routing engine, while a routing engine of a second router may act as a secondary or back-up routing engine.

In a typical architecture, router 20 includes interface cards (IFCs) 58A-58N ("IFCs 58") that receive packets on inbound links 60A-60N ("inbound links 60") and sends packets on outbound links 62A-62N ("outbound links 62"). IFCs 58 are coupled to primary routing engine 22 and secondary routing engine 40 by high-speed switch 56. In another embodiment, router 20 may be a multi-chassis router in which multiple routing nodes are physically coupled and configured to operate as a single routing node. One example of a multi-chassis router includes multiple line card chassis (LCCs), which include one or more interface cards (IFCs) for sending and receiving packets, and a central switch control chassis (SCC), which provides top-down management of the LCCs. U.S. Pat. No. 8,050,559, issued Nov. 1, 2011, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Pat. No. 8,050,559 are incorporated herein by reference.

One or more routing protocols implemented by routing process 26 establish (peer) routing sessions with other routers and, by way of these network communication sessions, exchange routing messages. As such, an operating system (OS) 30 executing within primary routing engine 22 implements kernel-level processes for handling data at various layers of the open systems interconnection (OSI) networking model (shown as protocol stack 36). OS 30 provides an API by which routing process 26 creates sockets 34 and establishes, for example, TCP/IP-based communication sessions for sending and receiving routing messages for each socket. Sockets 34 are logical constructs having data structures and state data maintained by OS 30 of primary routing engine 22 and may be viewed as acting as interfaces between routing process 26 and protocol stack 36. OS 30 also provides both a kernel space for execution of OS-related processes, such as replication driver 32 and the kernel itself, and an application space for execution of applications, such as routing process 26. Replication driver 32 may be implemented as a device driver. The kernel space and application space generally correspond to separate regions of memory, e.g., random access memory (RAM), in which applications, modules, and the like are executed, and OS 30 generally prevents applications executed in the application space from accessing memory addresses assigned to the kernel space.

Primary routing engine 22 of router 20 also includes replication application 28. One or more processors implemented in circuitry of router 20 execute replication application 28 to perform packet and data replication between primary routing engine 22 and secondary routing engine 40, in accordance with the techniques of this disclosure. Replication application 28 may, for example, receive data from routing process 26 to be written to one of sockets 34. In accordance with the techniques of this disclosure, replication application 28 passes such data to replication driver 32, executed within the kernel space provided by OS 30, which replicates the data to secondary routing engine 40 while writing the data to the one of sockets 34, as explained in greater detail below. In particular, OS 30 and OS 48 communicate data and acknowledgements via communication channel 64, which may correspond to a channel between sockets of OS 30 and OS 48.

Secondary routing engine 40 provides an operating environment for execution of routing process 44. Like routing process 26, routing process 44 implements one or more routing protocols and periodically updates routing database 42 to accurately reflect the topology of the network and the other network entities. That is, like routing process 26, routing process 44 sends and receives routing messages through replicated sockets 52, where each of the replicated sockets corresponds to one of sockets 34 currently in use for routing communications. Routing process 44 receives replicated routing messages from primary routing engine 22, updates routing database 42, and outputs routing messages as if it were handling all routing functions for router 20. Replicated sockets 52 of secondary routing engine 40 are logical constructs having data structures and state data maintained by OS 48 and act as an interface between routing process 44 and protocol stack 54, also of secondary routing engine 40. Like OS 30, OS 48 also provides a kernel space and an application space. One or more processors implemented in circuitry of router 20 may execute routing process 44 and replication application 46 in the application space provided by OS 48, and replication driver 50 in the kernel space provided by OS 48.

After opening a new routing session, routing process 26 interacts with operating system 30 to allocate a new socket of sockets 34 for the new routing session, and tags the socket (referred to as the "original socket") for replication by an API call to operating system 30. The call causes operating system 30 to asynchronously set up the replication communications between protocol stacks 36, 54 as described below.

In accordance with the techniques of this disclosure, when routing process 26 performs a write operation to send data to one of sockets 34, replication application 28 receives the data prior to the data reaching the one of sockets 34. Replication application 28 may then construct a write message including the data to send to replication driver 32. For example, replication application 28 may construct a message in the form of an io_buffer data structure as discussed in greater detail below with respect to FIG. 3. In general, this message may indicate that the data is to be written, and include the data to be written itself (or a pointer to a memory location at which the data is stored). Replication application 28 may then pass this message to replication driver 32.

In response to receiving this message, replication driver 32 may cause OS 30 to send data of the message (e.g., the data intended for one of sockets 34) to OS 48 for replication. Ultimately, replication driver 50 of OS 48 may receive the data and update one of replicated sockets 52 corresponding to the one of sockets 34 with this received data. In this manner, the one of replicated sockets 52 will reflect the state of the corresponding one of sockets 34. After updating the one of replicated sockets 52 with the data, replication driver 50 and/or OS 48 may send an acknowledgement of the data to OS 30 and/or replication driver 32.

In response to the acknowledgement, replication driver 32 and/or OS 30 may direct the data to the one of sockets 34. OS 30 may ultimately deliver the data from the one of sockets 34 to protocol stack 36, which encapsulates the data according to the OSI model to form a packet. OS 30 then sends the packet to switch 56, which directs the packet to an appropriate one of IFCs 58 to be sent via one of outbound links 62.

Router 20 may also receive a packet via one of inbound links 60. The one of IFCs 58 that receives the packet may send the packet to switch 56, which may direct the packet to protocol stack 36 of primary routing engine 22, assuming primary routing engine 22 is still active as the primary node. Protocol stack 36 may decapsulate the packet to extract application-layer data associated with an application, such as a routing instance of routing process 26. In accordance with the techniques of this disclosure, OS 30 may maintain a data structure (not shown) representative of applications for which data is to be replicated. Accordingly, OS 30 may determine whether the application-layer data is to be replicated to secondary routing engine 40 based on the application to which the application-layer data is to be delivered and the data structure.

If the application-layer data is to be replicated, OS 30 may deliver the application-layer data to replication driver 32. Replication driver 32 may again form a data structure including and/or representative of the application-layer data and send this data structure (e.g., the io_buffer data structure discussed in greater detail below) to OS 48. After OS 48 and/or replication driver 50 updates a corresponding one of replicated sockets 52, OS 48 may send an acknowledgement of the replicated data to OS 30.

OS 30 may receive a read request from routing process 26 to read data from the one of sockets 34 to which the received application-layer data is to be written. Replication driver 32 and/or OS 30 may wait until after the acknowledgement is received from OS 48/replication driver 50 before delivering data of the one of sockets 34 to routing process 26 in response to the read request.

In this manner, router 20 may perform a socket replication process between sockets 34 and replicated sockets 52 of primary routing engine 22 and secondary routing engine 40, respectively. In particular, this socket replication process does not need to involve alteration of a kernel of OS 30 or a kernel of OS 48. Thus, the techniques of this disclosure may be implemented in a router for which OSs 30, 48 are closed source or for which licensures prevent kernel alteration. That is, because the techniques of this disclosure can be performed, at least in part, by replication drivers 32, 50 (implemented as device drivers in this example), replication drivers 32, 50 have access to kernel-level resources, without modifying the kernel itself.

Figure 3:
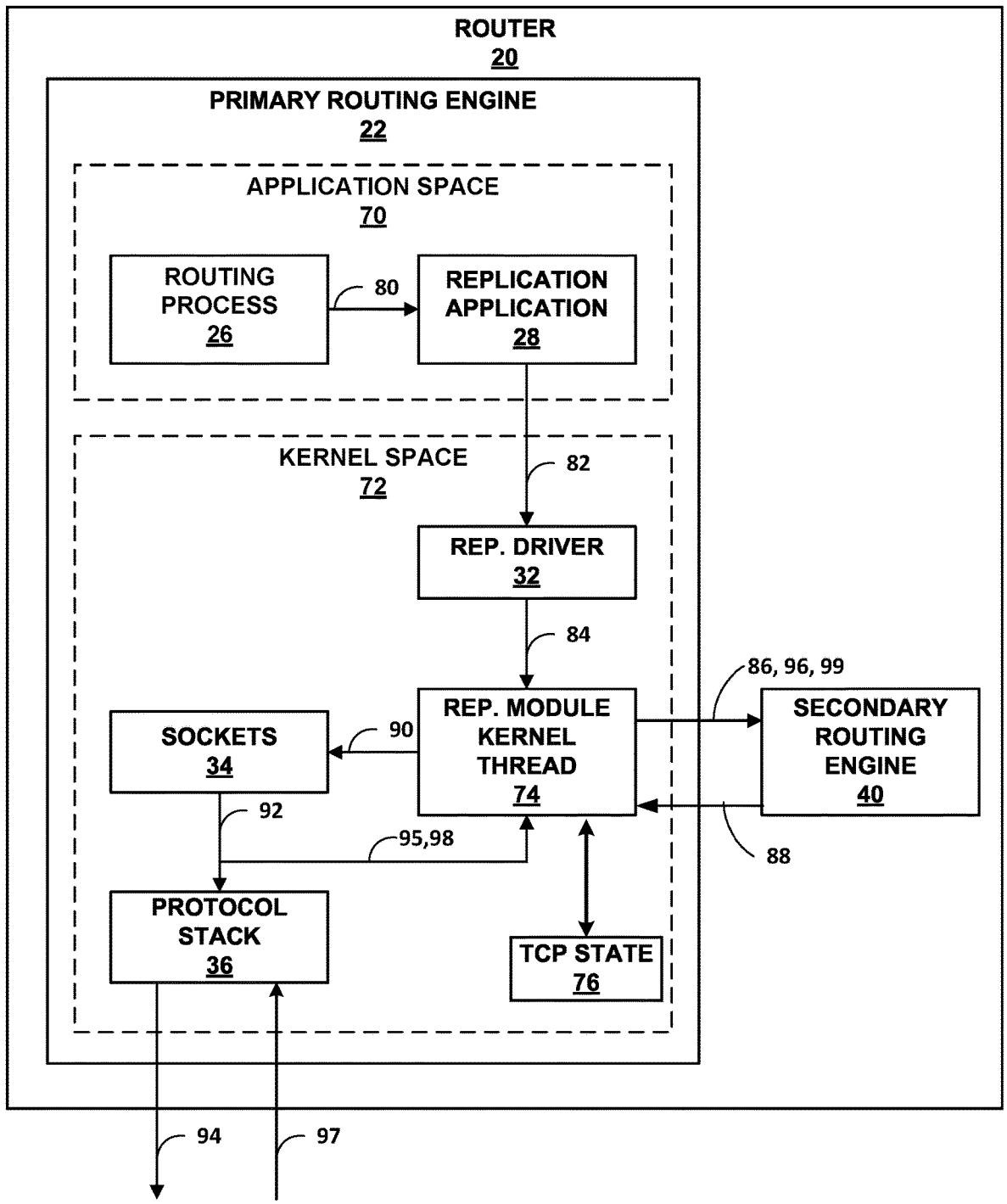
FIG. 3 is a flow diagram illustrating an example process for performing data replication according to the techniques of this disclosure.

FIG. 3 is a flow diagram illustrating an example process for performing data replication according to the techniques of this disclosure. In particular, FIG. 3 depicts an example set of components of router 20 of FIG. 2 in greater detail. In this example, primary routing engine 22 includes application space 70 and kernel space 72, provided by OS 30 of FIG. 2 (not shown in FIG. 3). One or more processors of router 20 execute routing process 26 and replication application 28 in application space 70, and replication driver 32, replication module kernel thread 74, sockets 34, protocol stack 36, and TCP state 76 in kernel space 72. Routing process 26 represents one example of a primary application that may write data to one of sockets 34, which may be replicated according to the techniques of this disclosure. Replication driver 32 and replication module kernel thread 74 may be functionally integrated as a single module or driver in some examples, but are illustrated and discussed separately for purposes of explanation.

In the process of FIG. 3, routing process 26 initially calls a function that is configured to write data to the socket using socket interfaces. However, according to the techniques of this disclosure, replication application 28 is part of a replication library of router 20. In particular, replication application 28 is configured to receive a socket write call from applications, such as routing process 26 of FIG. 3. Thus, the socket write system call (syscall) from routing process 26 is overridden, and the written data is sent to replication application 28 (80).

Replication application 28 constructs a write message and calls its own replication write function, which passes the write message to replication driver 32 (82). The write message may be in the form of a data structure, e.g., as shown below:

```
struct io_buffer {
    int io_flags; /* operation flags rd/wr */
    int  io_fd; /* socket descriptor for I/O after replication is performed */
    char* io_buffer; /* socket data */
};
```

The io_flags element of the io_buffer data structure may have one of the following values:
  IO_FD: socket file descriptor (FD) for read/write
  IO_REPL_FD: REPLICATION FD to replicate data to the backup (only once)
  IO_RD: socket READ OP
  IO_WR: socket WRITE OP
  IO_MORE: set by replication module to indicate to application that there is more data to be read.

The io_fd element of the io_buffer data structure represents a socket descriptor for one or more input/output (I/O) operations.

The io_buffer element of the io_buffer data structure is a buffer having a value that points to data for read/write operations. For the IO_REPL_FD operation, the value of the buffer points to the replication FD.

In this manner, replication application 28 writes the struct io_buffer data structure to replication driver 32. Replication application 28 may mark one or more of sockets 34 that should be interpreted as replicated by the kernel replication driver (e.g., /dev/repl) to replicate the data to secondary routing engine 40 or to append the data to the socket send buffer directly and trigger layer 4 processing of the data. In particular, replication driver 32 and/or replication module kernel thread 74 may maintain data indicating which of sockets 34 (including their respective TCP state 76) are to be replicated to secondary routing engine 40. In this manner, as explained in greater detail below with respect to FIGS. 6-12, when data for one of sockets 34 is received that is to be replicated, replication driver 32 and/or replication module kernel thread 74 may return this data to routing process 26 immediately after the data has been replicated to secondary routing engine 40, using a transport layer acknowledgment; this is in contrast with other systems where a different acknowledgement determines when to return the data to routing process 26.

Replication driver 32 then passes the data to replication module kernel thread 74 (84), which writes this data over a replication link or channel (e.g., a socket, represented by communication channel 64 of FIG. 2) to secondary routing engine 40 (86), which executes a similar replication kernel thread (not shown in FIG. 3). Replication driver 32 appends enough header information to this data for secondary routing engine 40 to identify the connection to which the data corresponds. The data could then be delivered to the application. In some examples, replication driver 32 and/or replication module kernel thread 74 creates a composite message that includes, in the buffer data, a TCP segment to be communicated to the peer network device via a connected socket of sockets 34. After the replication module kernel thread on secondary routing engine 40 has received this data, secondary routing engine 40 sends a TCP ACK acknowledging the received data to primary routing engine 22 (88). Instead of waiting for secondary routing engine 40 to send an explicit ACK message (e.g., a byte-level ACK sequence number) for each received replicated data block, primary routing engine 22 and secondary routing engine 40 rely on the TCP ACK for the corresponding (replication) TCP socket as a mechanism for determining whether the data block has been delivered and received by secondary routing engine 40. Instead of multiple acknowledgements (e.g., for each byte), primary routing engine 22 receives a single acknowledgment (e.g., a TCP ACK message with a packet-level sequence number). In some examples, primary routing engine 22 encapsulates multiple data blocks into a TCP segment and then, sends that TCP segment to the TCP socket for secondary routing engine 40 to receive. In response, secondary routing engine 40 returns one TCP ACK to acknowledge the entire TCP segment. Hence, a single acknowledgment may confirm receipt of multiple each data blocks, each of configurable size (e.g., a byte). Validity of messages is confirmed asynchronously while secondary routing engine 40 processed replicated data blocks. This ACK mechanism ensures minimal wait time for data to be processed and less CPU/network load caused by extensive messaging to acknowledge (ACK) back the replicated data once received at secondary routing engine 40.

In some examples, for protocols such as TCP that utilize an acknowledgement (ACK) mechanism, replication module kernel thread 74 may ensure that TCP ACK's will be sent out via protocol stack 36 only after data has been successfully replicated to secondary routing engine 40. However, replication module kernel thread 74 continues to process the replicated data for transmission to a destination while waiting for the TCP ACK from secondary routing engine 40. The ACK's generated by the TCP stack would be held at hooked code (as described herein) without kernel modifications. After replication module kernel thread 74 receives an ACK for the given data block from secondary routing engine 40, replication module kernel thread 74 identifies the one of sockets 34 for the data and signals the NF hooked code to release the TCP ACK for the data block. Replication module kernel thread 74 may also include a mechanism to periodically update primary routing engine 22 about the buffer size available on secondary routing engine 40 for each socket of sockets 34. This mechanism may be used for protocols like TCP to communicate window size (taking into account buffer size available on secondary routing engine 40's backup socket) in the TCP headers to the peer.

Without waiting for an explicit acknowledgement that the replicated data and instead relying on the TCP ACK, replication module kernel thread 74 on primary routing engine 22 appends the replicated data to the connected socket of sockets 34 for which the data was intended (pointed to by io_fd field of the object io_buffer received by replication driver 32) (90). Protocol stack 36 then receives the socket buffer data from the connected socket of sockets 34 (92) and processes the data accordingly to be sent via corresponding network protocols (94). Some attribute-fields in TCP state 76 are determined only when the received data is successfully replicated to secondary routing engine 40, which will most likely occur by the data's scheduled transmission time. Replication module kernel thread 74' of FIG. 4 may return an explicit acknowledgment when the data is successfully replicated as secondary routing engine 40.

Outbound data may be packetized into a number of packets and then, transmitted downstream, with appropriate header information, to a peer network device. Example attributes of the header include sequence numbers, such as a packet-level sequence number that is incremented for each sent packet, a byte-level sequence number that is incremented for each byte of sent data, and/or the like. Replication module kernel thread 74 or the complimentary replication module kernel thread of secondary routing engine 40 may employ byte-level sequence numbers for addressing bytes in each replicated data block in the socket buffer data.

Outbound data replication (as described herein) may not have available up-to-date state information (e.g., TCP state information about a TCP socket) because buffered data in one or more sent data buffers of sockets 34 has not been processed by protocol stack 36. Outbound data replication relies upon replication module kernel thread 74 to update the information in TCP state 76 and propagate such updates to the replication module kernel thread of secondary routing engine 40.

When protocol stack 36 sends an outgoing TCP segment (or another packet), a hooked code element in protocol stack 36 (e.g., transport layer) prompts replication module kernel thread 74 to update TCP state (95) and then, notify secondary routing engine 40 of the updated TCP state (96). Transport layer protocols such as TCP define "hooks" as well-defined points in a packet's traversal of that protocol stack. A hooked code element may be a pointer to a function that is called as soon as the hooked code is triggered. In other examples, replication module kernel thread 74 periodically updates TCP state 76 and then, sends TCP update messages secondary routing engine 40. The hooked code element may be one of a number of well-known hooks in existing hook infrastructure, such as Linux Netfilter ingress and egress hooks. Linux Netfilter implements a framework for packet mangling, outside the normal socket interface.

Replication module kernel thread 74 may ensure that any data received on one of sockets 34 that is to be replicated is not read by routing process 26 (and replication application 28) unless the data is replicated successfully to secondary routing engine 40. To achieve this, initially, received data is written to the appropriate one of sockets 34, and replication module kernel thread 74 is woken up in response to data being received by protocol stack 36. Replication module kernel thread 74 then sends the data to secondary routing engine 40, which acknowledges the data after receipt.

Receipt of an acknowledgement message (e.g., a TCP acknowledgment message) for each transmitted packet from the peer (97) causes another hooked code element in protocol stack 36 to prompt replication module kernel thread 74 to update TCP state 76 (98) and then, notify primary routing engine 40 (99) based on ACK sequence number, which refers to a sequence number of a last byte transmitted to the peer and a sequence number of a first byte of data to be transmitted next. Replication module kernel thread 74 retrieves the current TCP state 76 (99), generates a TCP update message to store the current TCP state 76, and sends the TCP update message to the replication module kernel thread of secondary routing engine 40. As described herein, replication module kernel thread 74 configures a hook (or another eavesdropping mechanism) on protocol stack 38 (e.g., transport layer) such that when data is processed by hooked code, the TCP update message is generated and then, communicated to the replication module kernel thread of secondary routing engine 40.

To illustrate by way of an example TCP socket as one of sockets 34, replication module kernel thread 74 updates secondary routing engine 40 with recent changes to TCP state 76 in accordance with at least the following three code statements. First, code statement tp→snd_una=ntohl (msg→remote.ack_seq) is operative to update send next sequence number to point to the next byte in the sequence space that peer is expecting. Second, code statement tp→snd_nxt=ntohl (msg→snd_seq) is operative to update a sequence number for a last byte out for transmission. Each byte of data written to the socket is assigned a sequence number representing that byte's position in a stream of bytes. In the write buffer, a last byte is assigned with a TCP send sequence number. This is different from the send sequence number mentioned above, which is the sequence number of the last byte out for transmission. Third, code statement tp→write_seq=ntohl (msg→tcp_snd_seq) is operative to update a sequence number of for the last byte written by routing process 26 (or another application) and replication module kernel thread 74 on the socket.

Inbound of types replication may be performed in a similar manner or a completely different manner. In one example, incoming data is received in the socket's receive buffer and then, the socket wakeup mechanism is slightly modified, so that for the replicated sockets of sockets 34, replication module kernel thread 74 is woken up instead of the real application that owns the socket (routing process 26, in this example). Different operating systems implement different wakeup call back mechanism for each socket type whenever data is received on the socket. This callback mechanism on the event "data-received" could be applied on any operating system. The example of replication module kernel thread 74 of this disclosure is configured to override this callback mechanism to wake up after reception of socket data.

Figure 4:
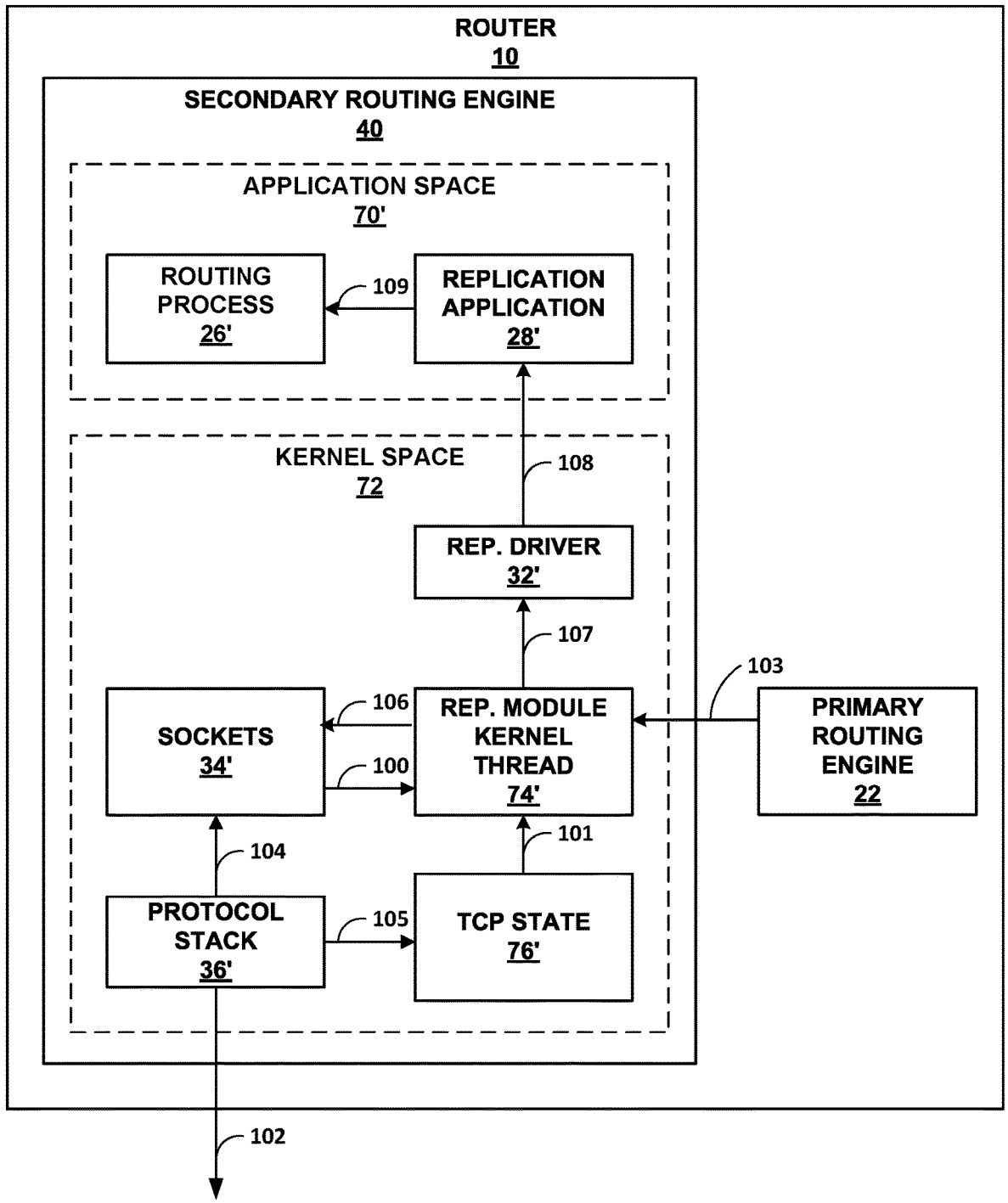
FIG. 4 is a flow diagram illustrating an example process for non-stop routing after a graceful switchover according to the techniques of this disclosure.

FIG. 4 is a flow diagram illustrating non-stop routing after a graceful switchover according to the techniques of this disclosure. The flow diagram also illustrates a read operation for inbound and outbound data as requested an application. Router 21 is another network device within a same network as router 20. Router 21 operates an example secondary routing engine 40 with complimentary components to components of router 20, such as routing process 26', replication application 28', replication driver 32', sockets 34', protocol stack 36', replication module kernel thread 74', and TCP state 76'. Each complimentary component operates in parallel and in event of a switchover, the complimentary component effectuates non-stop routing for a primary routing engine.

FIG. 4 shows TCP state 76' for storing per-process transport layer states of replicated socket FDs being retrieved and/or (when needed) updated by replication application 28'. Replication module kernel thread 74' maintains an up-to-date TCP state 76' of all backup sockets 34' to which connected sockets are replicated.

Router 10 benefits from having replication module kernel thread 74 maintain replicated sockets 34' (100) at a current or near-current TCP state 74' (101) with complimentary sockets 34 at router 20; as one benefit, protocol stack 36' may commence message routing (102) almost immediately after assuming control over routing functionality of the primary routing engine. Router 10 may receive a signal indicative of a switchover to secondary routing engine 40 and in response, commence the message routing for router 20 (103). In some examples, TCP state 76' stores a send next sequence number identifying a first send next data block in a send buffer of replicated sockets 34'. Primary routing engine 22 had the first send next data block scheduled for transmission before the switchover halted the scheduled transmission. After sending each message, protocol stack 36' may update one or more memory buffers in sockets 34' (104). In some examples, hooked code elements may update TCP state 76' in response to inbound and outbound data (105).

Replication module kernel thread 74 executes a data read operation for either a send buffer or a receive buffer in sockets 34'. An application in application space 70' issues a read request that is ultimately services by replication module kernel thread 74. Replication application 28' may be woken up by receiving the read request, causing replication module kernel thread 74 to perform the read operation and retrieve one or more requested data blocks from a buffer in sockets 34' (106) and deliver the retrieved data to replication driver 32' (107), which sends the data to replication application 28' (108), which delivers the data to routing process 26' (109). Replication application 28' completes the read request by providing the requested data clocks to routing process 26'.

Figure 5:
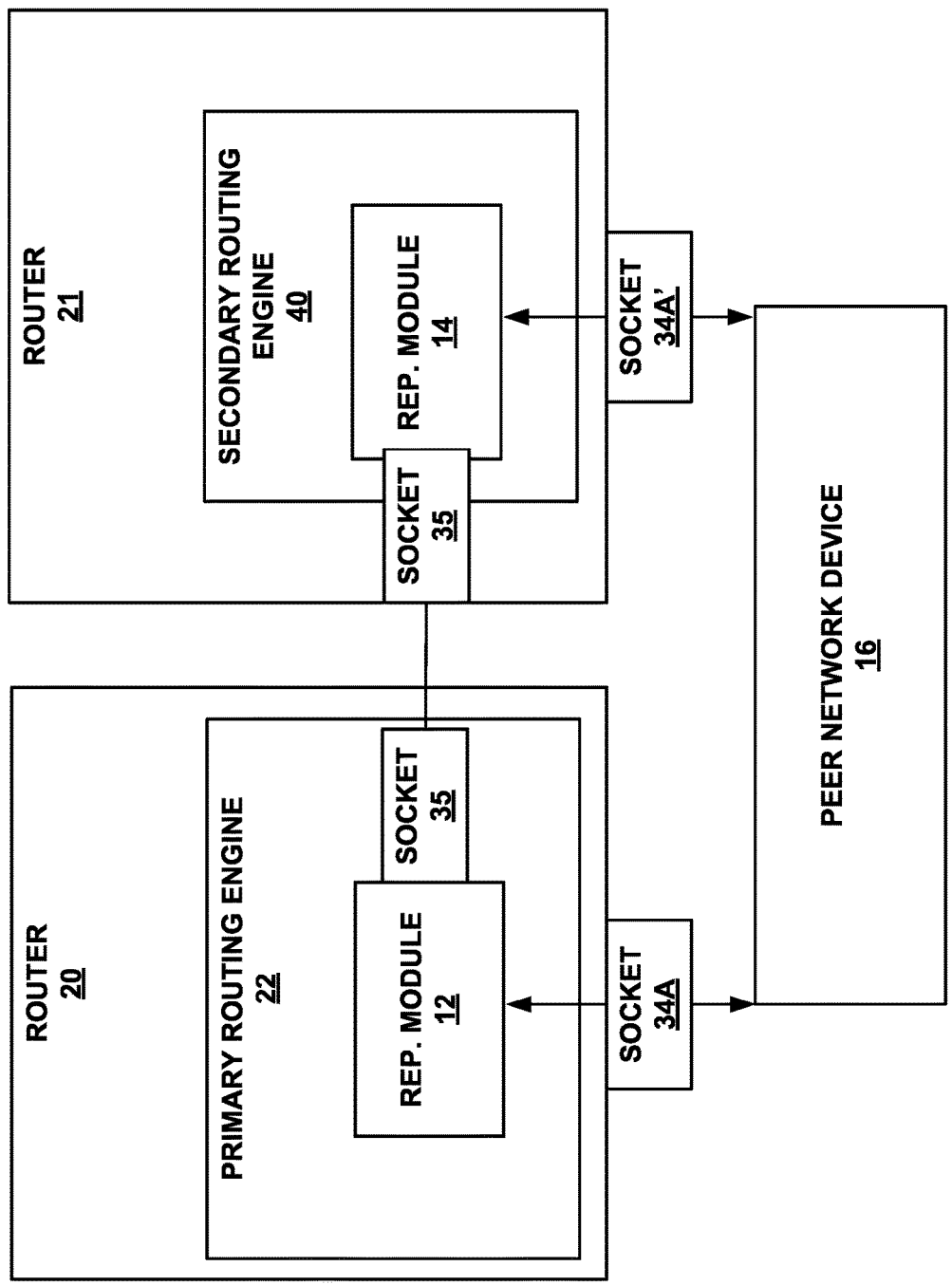
FIG. 5 is a block diagram illustrating an example network capable of non-stop routing from either a primary router or a secondary router using the techniques of this disclosure.

FIG. 5 is a block diagram illustrating an example network 2 capable of non-stop routing from either a primary router 20 or router 21 using the techniques of this disclosure. FIG. 5 illustrates examples of network 2 where primary routing engine 22 and secondary routing engine 40 operate in separate physical network devices as opposed to residing in a same network device.

Network 2 includes a number of network devices including routers 20, 21 operating as a primary node and a standby node, respectively. As the standby node, router 21 is configured to provide control over routing functionary for the primary node, router 20, in response to a switchover. A number of mechanisms trigger switchovers and, as one example, a failure at router 20 invokes the switchover to router 21 allowing (secondary routing engine 40 of) that router 21 to resume routing sessions with a peer network device. Besides failure, another cause of switchover may cause secondary routing engine 40 to resume routing session on behalf of primary routing engine 22.

Replication module 12 represents one or more of replication application 28, replication driver 32, and replication module kernel thread 74 of FIG. 3. Replication module 14 compliments replication module 12 and operates in router 21 as a backup replication module.

Router 21 comprises one or more processors implemented in circuitry and configured to execute replication module 14 (i.e., a standby replication module). As described herein, replication module 14 may compliment replication module 12 and include replication module kernel thread 74' or a combination of replication application 28', replication driver 32', and replication module kernel thread 74' as illustrated in FIG. 4.

As described herein, replication module 14 generates sockets 34' using information corresponding to respective sockets 34 at router 20, the primary node, for network 2. For example, replication module 14 generates socket 34A' using information corresponding to socket 34A at router 20 where socket 34A is a connected socket providing network communication connectivity with the peer network device of another network, for example, via a transport layer protocol (e.g., TCP). Socket 34A' is to operate as a backup socket for socket 34A in case of switchover. As described herein, replication module kernel thread 74' configures the backup socket to be pre-established (e.g., pre-connected) to the same peer network device as the connected socket, enabling the backup socket to provide network communication connectivity with the same peer network device and effectuate the switchover to router 21 (e.g., after the failure of router 20 or another primary node. Hence, at least one portion of such information describes a transport layer state (or transport state) of the socket at router 20.

Replication module 14, upon assuming control over the routing session with the peer network device, resumes exchanging session messages starting with a next message after the last message communicated by router 20. In this manner, router 21 continues the routing session where router 20 left off with the next message (e.g., a next data block). Replication module 14 retrieves a portion of a send buffer of socket 34A' in accordance with the transport layer state of socket 34A. The send buffer may include a sequence of data blocks have been written to socket 34A by primary routing engine 22. The transport layer state of socket 34 includes information identifying the portion of the send buffer storing at least one next data block to be transmitted to the peer network device from the primary node at a time of the switchover (e.g., failure), and send the at least one next data block to the peer network device via socket 34A'.

Replication module 14 updates the transport layer state of socket 34A' after transmitting a transport layer protocol data unit (e.g., a TCP packet which may be known as a segment) to the peer network device. The transport layer protocol data unit includes a last transmitted data block. In preparation of the switchover, replication module 14 of secondary routing engine 40 (of router 21), by invoking hooked code elements in protocol stack 36 of primary routing engine 22 (at router 20), may receive a socket state update (e.g., a transport layer state update) when protocol stack 36 transits the data unit via socket 34 and the, propagate that update to socket 34A'. The above update may include information indicating a transport layer protocol sequence number for identifying (e.g., pointing to a location of) the last transmitted data block in the send buffer of socket 34A'. Similarly, after the switchover, replication module 14, by invoking hooked code elements in protocol stack 36', listens for and intercepts (e.g., eavesdrops) transmissions of transport layer protocol data unit, and for each transmitted data unit sent to peer network device 18, replication module 14 updates the transport layer state of socket 34A' with a transport layer protocol sequence number of that data unit. Because the updated sequence number reflects a most recent transmitted data block, replication module 14 may determine a sequence number of at least one next data block to be sent to peer network device 18. In one example, replication module 14 identifies a particular subsequence of unsent/send next data blocks in the send buffer of socket 34A' and then, updates a transport layer state of socket 34A' with a first sequence number or a sequence space of that subsequence.

Peer network device 18 may respond with an acknowledgement to receiving the at least one next data block and an example acknowledgment includes a socket acknowledgment. An example socket acknowledgment refers to acknowledgement message (e.g., a TCP ACK message) in accordance with a same transport layer protocol of socket 34A' (e.g., a TCP socket). The socket acknowledgment may include information representing the last message (e.g., a last data block) received (i.e., acknowledged) by peer network device 18 and informing router 21 of a next data block expected in a next transmission.

In response to receiving an acknowledgement from peer network device 18, replication module 14 updates the transport layer state of socket 34A' with information identifying a last acknowledged data block. As described herein, socket 34A' represents a transport layer connection (e.g., TCP connection) between router 21 and peer network device 18, and the above information may be a transport layer protocol sequence number identifying (e.g., pointing to a location of) the last acknowledged data block in the send buffer of socket 34A'. Having an arrangement of data blocks in the send buffer mapped to an address space of sequence numbers, replication module 14 may use the acknowledgement to identify a next data block to be sent to peer network device 18 in continuation of the routing session for router 20. Replication module 14 stores a sequence number of the next data block as part of the transport layer state of socket 34A' and to identify a portion of the send buffer as a subsequence of unsent/send next data blocks. Similar to the hooked transmissions of data units, replication module 14, by invoking hooked code elements at protocol stack 36 and/or protocol stack 36', receives and propagates socket state updates in response to acknowledgment messages received via at socket 34A and/or socket 34A' from peer network device 18. In this manner, replication module 14 may partition the socket buffer into respective subsequences for unacknowledged transmitted data blocks and non-transmitted data blocks.

Via socket 35, which is configured to provide network communication connectivity between primary routing engine 22 of router 20 and secondary routing engine 40 of router 21, replication module 12 and replication module 14 perform socket replication. Replication module 12 replicates data including state information for socket 34A by writing that data to socket 35 and then, sending the replicated data as a socket message to secondary routing engine 40 of router 21. When primary routing engine 22 of router 20 transmits and receives data units to and from peer network device 18 via socket 34A, replication module 12 propagates socket state updates to replication module 14 via socket 35 (i.e., a replication socket).

Figure 6:
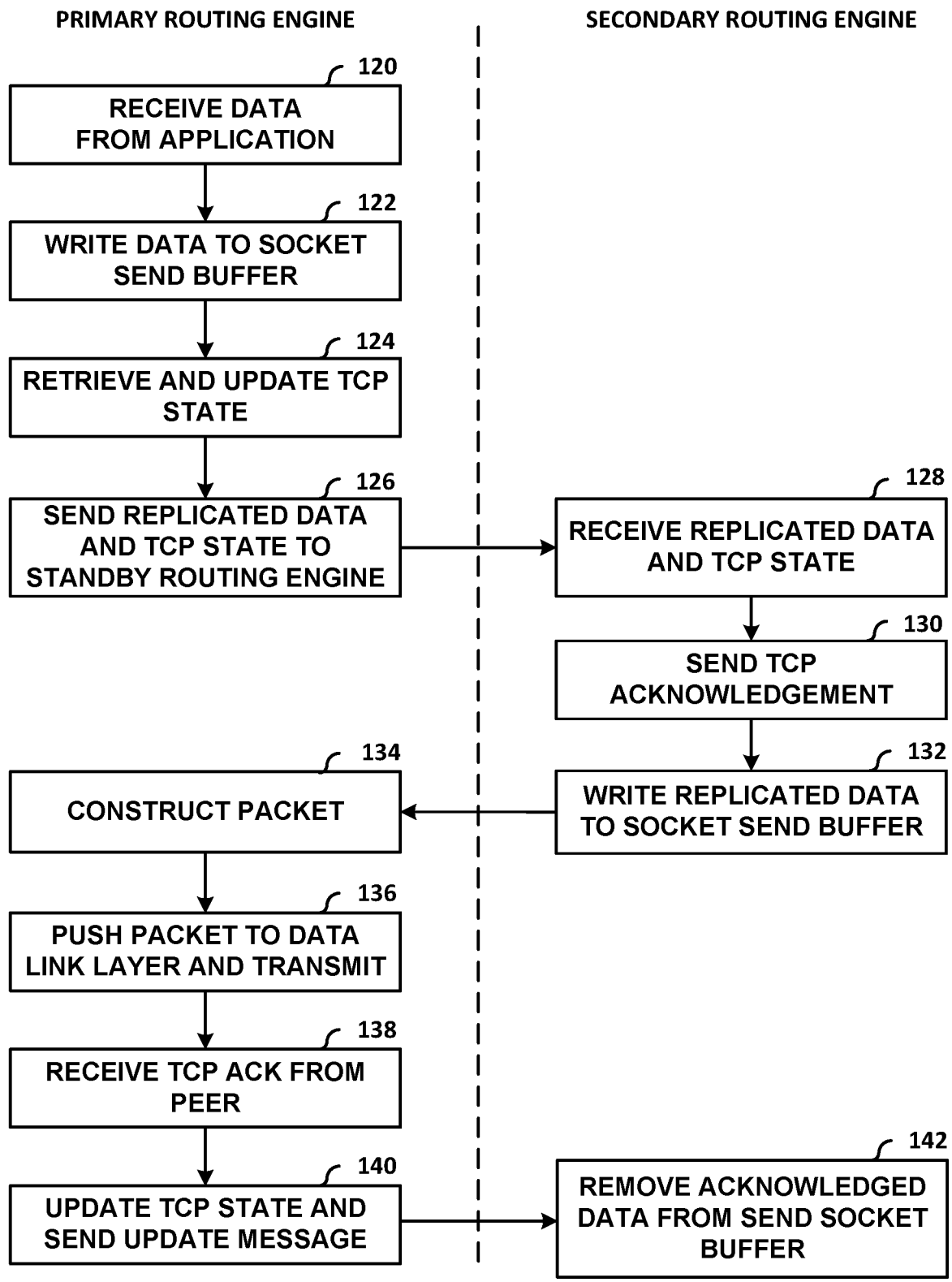
FIG. 6 is a flowchart illustrating an example method for replicating outbound data received from a local application to be written to a socket for communication from a primary routing engine to a peer network device according to the techniques of this disclosure.

FIG. 6 is a flowchart illustrating an example method for replicating outbound data received from a local application to be written to a socket for communication from primary routine engine 22 to a peer network device according to the techniques of this disclosure.

As shown, the outbound data is replicated to secondary routing engine 40 according to the techniques of this disclosure. Initially, replication application 28 executing within a user space of primary routing engine 40 receives data from an application (e.g., routing process 26) to be written to one of sockets 34 for outbound communication to a peer network device (120). The one of sockets 34 is designated as a socket for which data is to be replicated, in this example, to support graceful failover in the event of failure of the primary routing engine. Thus, as discussed above, replication application 28 delivers the data to replication driver 32, which sends the data to replication module kernel thread 74 of FIG. 3, which writes the data to a socket send buffer (122).

Replication module kernel thread 74 retrieves current state information from TCP state 76 and based on the data written to the socket send buffer, updates TCP state 76 for the corresponding TCP socket. In one examples, updating TCP state 76 is in accordance with the following three code statements:

Replication module kernel thread 74 first executes code statement tp→snd_una=ntohl (msg→remote.ack_seq) to update send next sequence number to point to the next byte in the sequence space that peer is expecting. Second, replication module kernel thread 74 executes code statement tp)→snd_nxt=ntohl (msg→snd_seq) is operative to update a sequence number for a last byte out for transmission. Each byte of data written to the TCP socket is assigned a sequence number representing that byte's position in a stream of bytes. In the write buffer, a last byte is assigned with a TCP send sequence number. This is different from the send sequence number mentioned above, which is the sequence number of the last byte out for transmission. Replication module kernel thread 74 executes third code statement tp→write_seq=ntohl (msg→tcp_snd_seq) is operative to update a sequence number of for the last byte written by primary application on the TCP socket.

Replication module kernel thread 74 sends a representation of the data to secondary routing engine 40 (126). For example, replication module kernel thread 74 may instantiate a message according to the io_buffer data structure discussed above. Replication module kernel thread 74 may then send this message to secondary routing engine 40.

Secondary routing engine 40 receives the message from primary routing engine 22 (128). Secondary routing engine 40 responds to the receiving the message by sending an acknowledgement of a successful transmission (130). Secondary routing engine 40 (in particular, a replication module kernel thread similar to replication module kernel thread 74 of primary routing engine 22) writes the replicated data in the received message in a corresponding send buffer of backup socket 34' and updates backup socket 34' corresponding to the replicated data in the message to reflect a current state of corresponding connected socket 34 for primary routing engine 22 (132). The replication module kernel thread may record the updated TCP state 76 for the corresponding connection socket 34 of primary routing engine 22. In this manner, if primary routing engine 22 fails over to secondary routing engine 40, secondary routing engine 40 can operate on behalf of primary routing engine 22, to prevent disruption of established network communications.

Primary routing engine 22 receives the acknowledgement from secondary routing engine 40. This causes protocol stack 36 to construct a packet from a number of bytes of the data of the one of sockets 34 (134), e.g., encapsulating the application-layer data with various network layer headers. Replication module kernel thread 74 then delivers the data received from replication driver 32 to the one of sockets 34 by pushing the data (in packetized form) to data link layer of protocol stack 34 and transmits each packet of data (136). Ultimately, one of IFCs 58 outputs the packet.

Assuming a peer received the transmitted data successfully and none of the packets were dropped, primary routing engine 22 receives a TCP acknowledgement (ACK) from the peer (138) and in turn, replication module kernel thread 74 updates TCP state 76 of the corresponding socket 34. Replication module kernel thread 74 propagates updated TCP state information by sending, to secondary routing engine 40, an update message via the replication socket (140). In response to the updated TCP state information, the replication module kernel thread of secondary routing engine 40 updates corresponding backup socket 34' and removes acknowledged data from send socket buffer (142). In some examples, the replication module kernel thread of secondary routing engine 40 removes the acknowledged data only if that data has been read by an application.

As described herein, socket data replication is piggy backed with TCP state 76 of the connection at that moment. When secondary routing engine 40 receives the replicated data for transmission, the replicated data is queued on a send buffer of a Socket I/O object for the connection. A write count on Socket JO object is incremented by a number of bytes received. In some examples, secondary routing engine 40 may queue the replicated data in the send buffer only if there is enough space in that buffer to accommodate the replicated data. The replication module kernel thread of secondary routing engine 40 marks data blocks as read only if the application has read them. The replication module kernel thread of secondary routing engine 40 removes/frees bytes of data from the queue in response to a TCP ACK for these bytes from the peer. Primary routing engine 22 may generate a TCP/socket state update message to store the TCP ACK and related sequence number(s). For this to happen, replication module kernel thread 74 and/or the replication module kernel thread of the secondary routing engine 40 may associate each data block queued on the Socket JO receive buffer with the TCP receive stream sequence space. To generate the update message, replication module kernel thread 74 fetches state information from TCP state 76, prepares a composite message with the data to be transmitted, and then, sends the message to secondary routing engine 40.

When the TCP/socket state update message is received for the connection corresponding to the replicated socket, the replication module kernel thread of the secondary routing engine 40 checks if the received TCP ACK correspond to any data block (fully or partially) and if such a data block is identified, the replication module kernel thread of the secondary routing engine 40 removes the data block from the socket JO buffer or reduces the data blocks size accordingly.

To illustrate by way of example, if the replication module kernel thread of the secondary routing engine 40 receives a TCP update message with ACK sequence number of "S4" and each byte until sequence space S4 is read by an application, the replication module kernel thread of the secondary routing engine 40 removes the first two data blocks from the socket send buffer. If the replication module kernel thread of the secondary routing engine 40 receives a TCP update message with ACK sequence no. "S6" instead, the replication module kernel thread of the secondary routing engine 40 waits to remove data blocks from socket send buffer as soon as those data blocks are read by the application.

The following describes primary routing engine 22 or secondary routing engine 40 handling of "last UNACKed window" at the time of switchover. If the replication module kernel thread of secondary routing engine 40 determines at least some data to be transmitted in connected socket 34's I/O buffer, that data is written over to corresponding I/O buffer of backup socket 34'. In one example, the replication module kernel thread of secondary routing engine 40 determines a value resulting from write_seq−snd_nxt and based on that value, determines that connected socket 34's send buffer includes one or more data blocks not yet transmitted to the peer by primary routing engine 22. In addition to untransmitted data, there may be at least some unacknowledged (e.g., UNACKed) data in the connected socket send buffer given by value resulting from snd_una−snd_nxt. Any data that is pointed to by sequence number snd_nxt onwards is transmitted from primary routing engine 22 to secondary routing engine 40, leaving a remainder of data to be to handled with future acknowledgment messages (ACKs) from the peer. Connected socket 34 is corked and all data is written over to backup socket 34' which is now active. Corking of any socket is done to avoid retransmitting data; secondary routing engine 40 have to adjust backup socket 34' state information and header information of incoming data units such that both the socket and the header point to a location of a next data block to send. This location corresponds to a data block of the send buffer of backup socket 34' denoted by the sequence number snd_nxt.

TCP state information for backup socket 34', such as sequence number snd_nxt, may be updated only after the data is processed by the socket as described herein. Socket write data is communicated to the secondary routing engine 40 before being processed by protocol stack 34. It is possible that primary routing engine 22 might have sent some data that has not been updated/replicated to secondary routing engine 40 because primary routing engine 22 crashed just after transmitting the TCP segment or the administrator triggered the switchover. In that case, updated sequence number snd_nxt will not be communicated to secondary routing engine 40. Hence, when secondary routing engine 40 becomes a new primary routing engine after the switchover, the new primary engine may lag behind the old primary with respect to snd_nxt. After the switchover, the new primary routing engine transmits old data that has already been ACKed (e.g., acknowledged) by the old primary routing engine. When the new primary routing engine receives an ACK, this ACK may be more than what is already transmitted by the old primary routing engine. This may cause both the new primary routing engine and the peer network device to keep transmitting the same data, resulting in connection flap.

To mitigate the above connection flap issue, the replication module kernel thread is programmed to hook at NF_IP_LOCAL_OUT. The of secondary routing engine 40 or the replication module kernel thread 74 of the primary routing engine keeps track of each connection being replicated with minimal state information (e.g., TCP state machine parameters). Once the replication module kernel thread finds new TCP data going out of the new primary, the replication module kernel thread records the sequence number snd_nxt from a TCP data segment header. Any new ACK coming in from the peer which has ACK sequence number more than the snd_nxt transmitted by the new primary till that point is adjusted to current snd_nxt, the replication module kernel thread recomputes checksums based on the new ACK seq. This new ACK sequence is well accepted by the new TCP state machine and protocol stack 34. The replication module kernel thread continues to transmit next data. Once the replication module kernel thread determines that snd_nxt is same as snd_una, the replication module kernel thread sets off a flag to update the snd_una post switchover, commencing normal operations for the connections.

Figure 7:
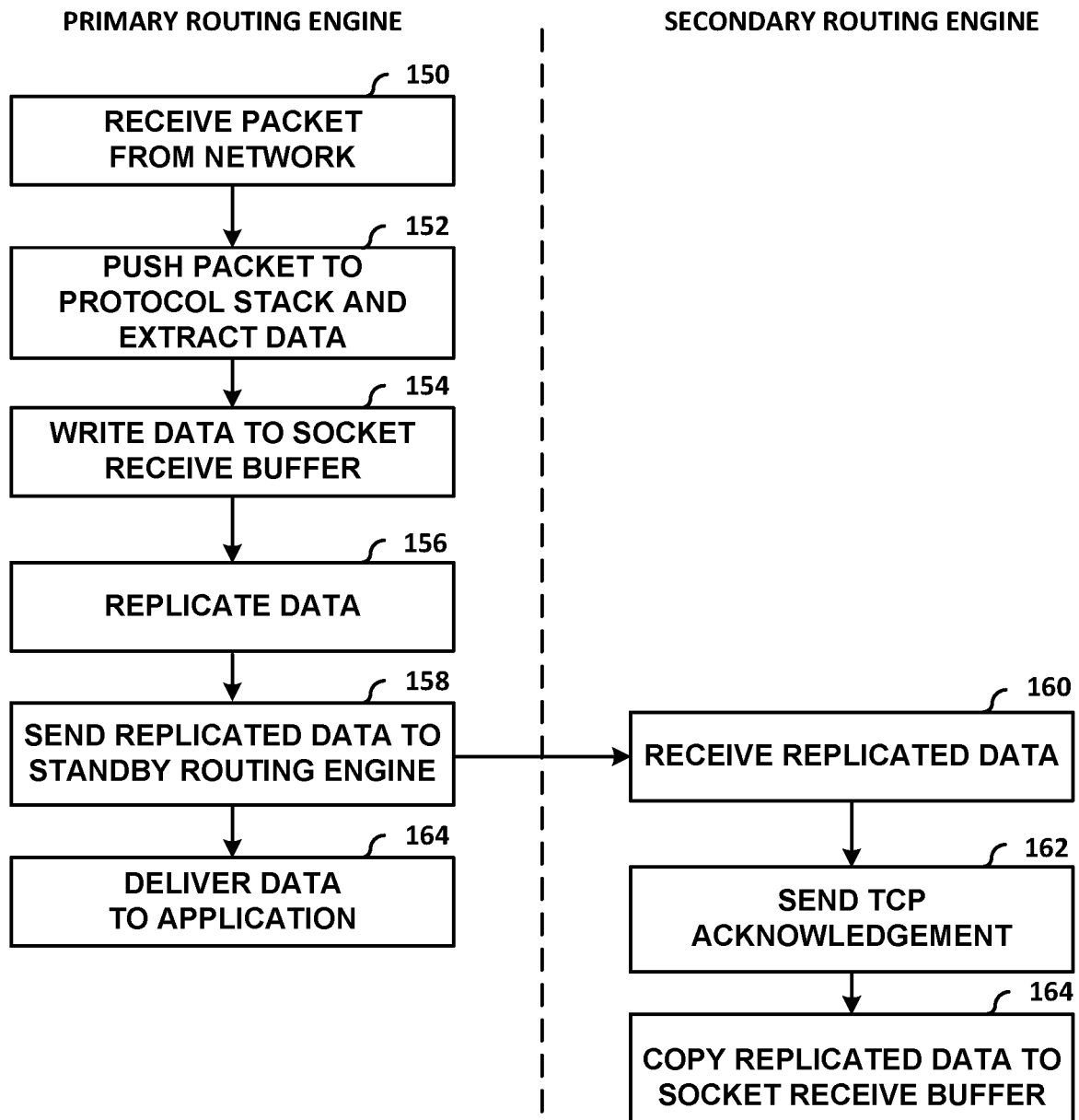
FIG. 7 is a flowchart illustrating an example method for replicating inbound data received from a peer network device via a socket associated with primary routine engine according to the techniques of this disclosure.

FIG. 7 is a flowchart illustrating an example method for replicating inbound data received from a peer network device via a socket associated with primary routine engine 22 according to the techniques of this disclosure. As described, the inbound data is replicated to secondary routing engine 40 according to the techniques of this disclosure. Initially, primary routing engine 22 receives data from the network via protocol stack 36 (150). That is, protocol stack 36 receives a packet and decapsulates the packet to extract application-layer data. Ultimately, protocol stack 36 delivers this data to one of sockets 34 (152), which prompts a wake-up of replication module kernel thread 74.

Replication module kernel thread 74 then receives the data (154), updates TCP state 76 with current TCP state information based on received data, and replicates the received data (156). Replication module kernel thread 74 then sends replicated data (e.g., a message constructed according to the io_buffer data structure discussed above) to secondary routing engine 40 (158).

Secondary routing engine 40 receives a socket message having the replicated data (160). As discussed herein, secondary routing engine 40 responds to the socket message by sending a TCP acknowledgement for the socket message (and not necessarily the replicated data) (162) and updating backup socket 34' using state information for corresponding connected socket 34 (162). Secondary routing engine 40 sends the TCP acknowledgement to notify primary routing engine 22 that the socket message has been received. Secondary routing engine 40 may process the received data and then, copy the received data into a send buffer of the backup socket, in the event of a switchover prior to primary routing engine 22 sending the data (164).

Primary routing engine 22 then receives the acknowledgement (166). Because primary routing engine 22 does not prohibit read requests for the received data, applications such as a routing process may read the data during replication. Replication module kernel thread 74 also sends an acknowledgement of the packet to a source of the packet after receiving the TCP acknowledgement from secondary routing engine 40 (170). Although not shown in the example method of FIG. 6, replication module kernel thread 74 may also cause protocol stack 36 to send an acknowledgement of receipt of the data to a device from which the data was received (e.g., another router) in response to receiving the acknowledgement from secondary routing engine 40.

Figure 8:
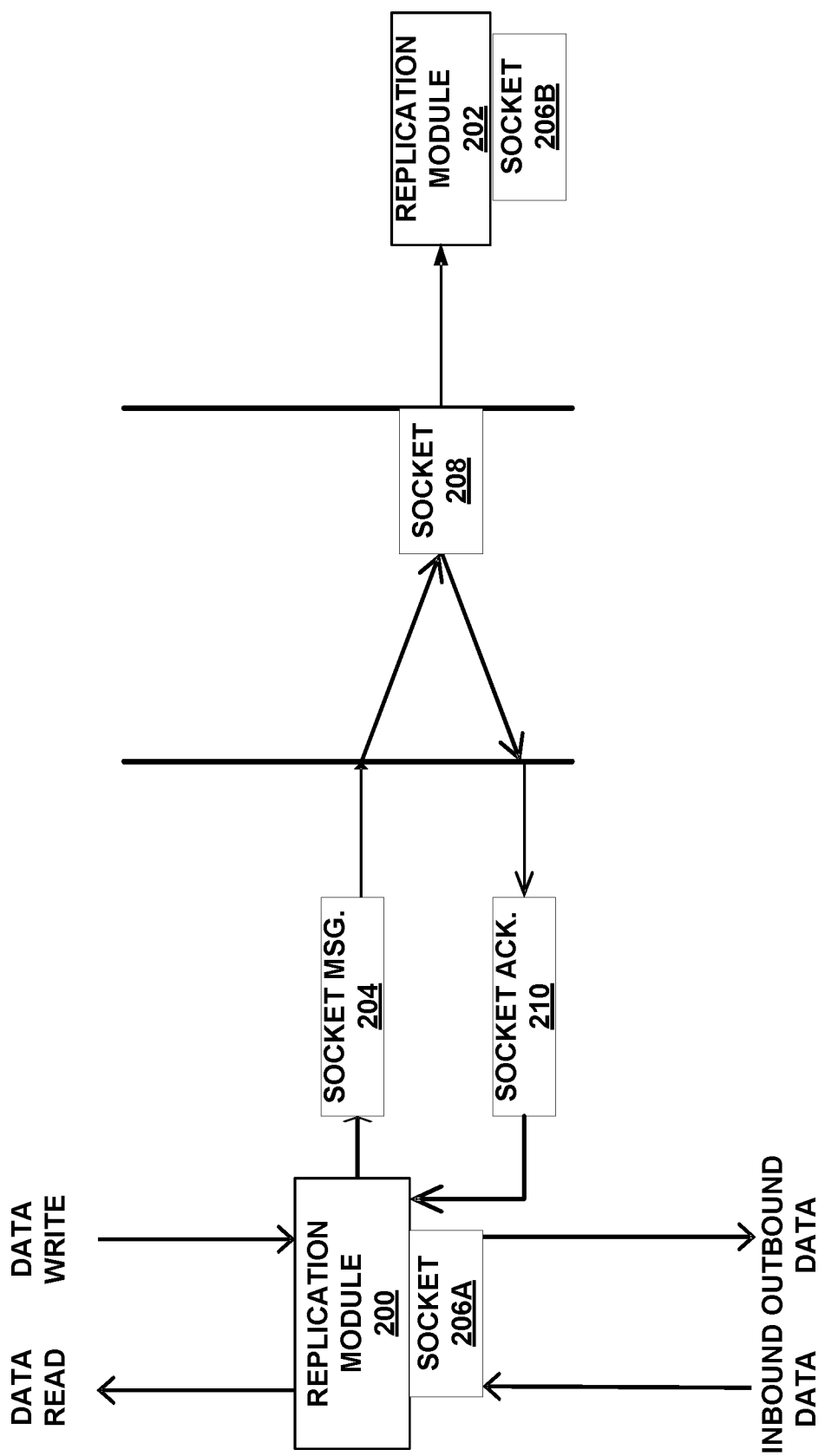
FIG. 8 is a conceptual diagram illustrating messaging-free socket replication according to the techniques of this disclosure.

FIG. 8 is a flow diagram illustrating messaging-free socket data/state replication according to the techniques of this disclosure. A mechanism implementing messaging-free socket replication may operate on primary replication module 200 and/or backup replication module 202 within primary and standby nodes, respectively. Any mechanism implementing messaging-free socket replication does not wait for a standby node (e.g., secondary routing engine 40 of FIG. 1) to send an explicit acknowledgement message for each replicated data block that is received and instead, relies on a TCP ACK for a (replication or backup) TCP socket. Some examples rely solely on the TCP ack to know that a particular data block has been delivered to the standby node.

Some examples continue to send the explicit ACK message for which a primary routing engine (e.g., primary routing engine 22) may validate asynchronously while the standby processes replicated data blocks. This mechanism of replication ensures minimal waiting time for data to be processed and less CPU/network load caused by extensive messaging to ACK back the data replicated.

Some examples establish on the primary node socket 206A, a TCP socket, to be connected to a peer and engage in a routing session to exchange routing information. Some examples establish on the standby node socket 206B, another TCP socket, to operate as a backup socket for socket 206A.

In one example where the primary and the standby replicate outbound data, when a data block is received from an application, replication module 200 sends the data block to replication module 202 over socket 208, a TCP socket that may be referred to as a replication socket. Replication module 200 may write the data block a memory buffer and, via a socket interface, generate socket message 204. One example of socket message 204 is a composite message combining the data block and state information for socket 206A. Replication module 200 on the primary node pushes the data block to a protocol stack after the data block is replicated and socket acknowledgment 210, a TCP ACK, is received confirming that the standby node received the replicated data block. The standby node reads the replicated data block on the TCP socket and queues the data block on that socket in a socket I/O buffer (e.g., a socket send buffer). Replication module 200 may include a replication module kernel thread (e.g., replication module kernel thread 74 of FIG. 1) configured to receive the TCP ACK on the TCP socket, designates or marks the data block as replicated, and informs the primary replication module to continue processing application data including the replicated data block. In some examples, the replication module kernel thread receives a single ACK message acknowledging the standby node's receipt of a TCP segment encapsulating the replicated data block. The single ACK message may acknowledge a first or last data block in the TCP segment (e.g., with a sequence number) or acknowledge the whole TCP segment. The single ACK message may represent a next block that is expected in a next TCP segment (e.g., with a sequence number). When comparing to an explicit ACK message for each byte of the replicated data block, receiving the single ACK message eliminates a latency in the replication process. As a result, the replication module kernel thread consumes less time replicating data and there is an increase in a rate at which data is transmitted from the primary node.

An alternative replication module 200 pushes the data block onto the stack and at a transport layer, writes, onto the memory buffer of socket 208, a transport layer packet that includes the data block. One example of socket message 204 is a composite message combining the transport layer packet, such as a TCP segment, and TCP state information for socket 206A.

In one example where the primary and the standby replicate inbound data, when a data block is received from a peer and is encapsulated in a packet, the primary replication module replicates the data block and sends the replicated data block over the TCP socket corresponding to the standby node. Similar to the outbound data, the backup replication module reads the data block on the TCP socket and queues the read data block on the TCP socket in a socket receive buffer. The standby communicates a TCP ACK that the replication module kernel thread of the primary node receives, confirming receipt of the replicated data block. The primary continues processing the data block. In the event of a switchover, the application may read the data block from the receive buffer.

As another benefit to employing messaging-free socket data/state replication as described herein, an explicit ACK message is not generated for every replicated data block that the standby node receives. As an example, a single TCP ACK may be sent to acknowledge a sequence space spanning multiple data blocks. This reduces the overall messaging processing load on the nodes, a network load, and a waiting period for the data queued on the socket IO buffer to be processed on the primary. Replication of socket data/state is much faster. The standby node benefits from the backup replication module handling missed TCP state data (e.g., TCP state machine parameters) at the time of planned/unplanned switchover. The backup replication module may include a NF hook module to effectuate the above socket replication mechanism.

Figure 9:
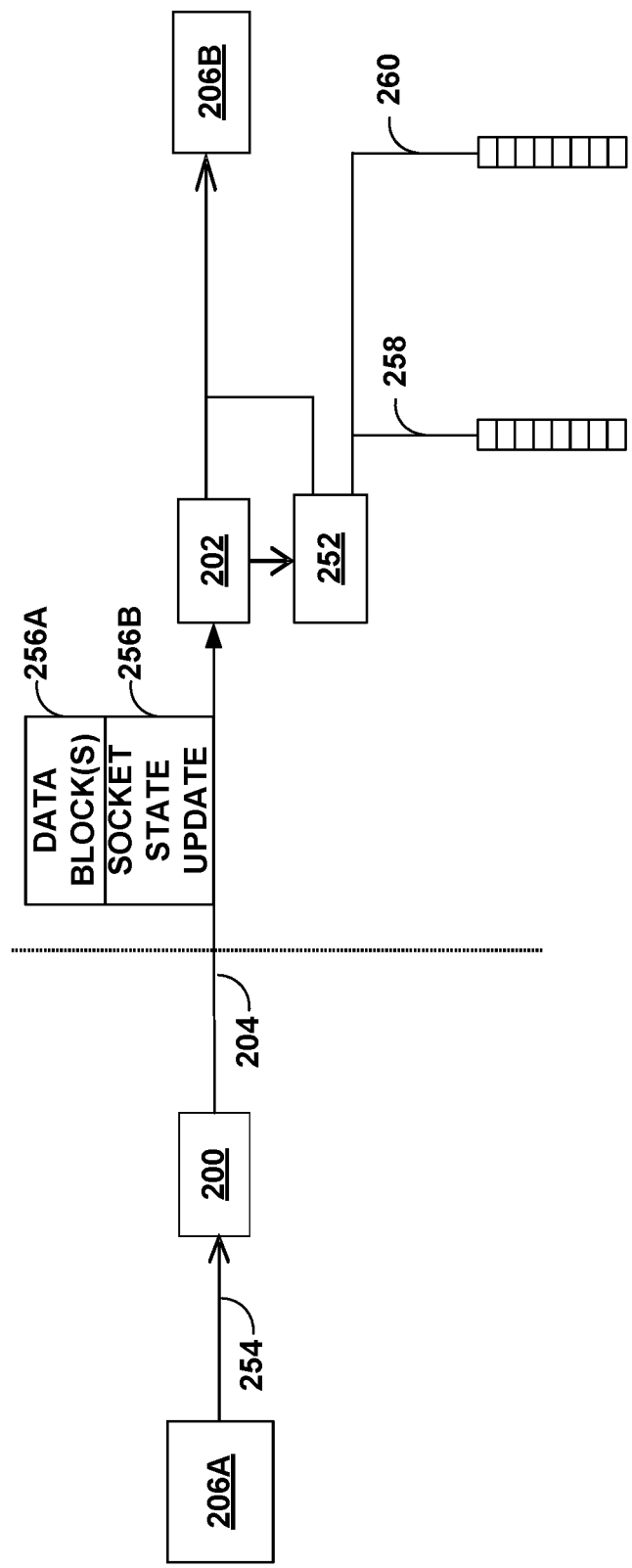
FIG. 9 is a conceptual diagram illustrating an example process for updating a pre-connected socket according to the techniques of this disclosure.

FIG. 9 is a conceptual diagram illustrating an example process for updating a pre-connected socket according to the techniques of this disclosure.

Similar to FIG. 8, the example process involves a primary node and a standby node of which these respective nodes include replication module 200 and replication module 202. The primary node employs a TCP socket for communicating with peers for learning routes and routing application data. The TCP socket is depicted as socket 206A may be known as a pre-connected socket. The primary node has another TCP socket for communicating replicated data to the standby. Both the primary node and the standby node manage send and receive buffers for their sockets. As described herein, the standby node generates object 252 to maintain current state information for socket 206A.

While communicating with the peer over the TCP socket, the primary node may receive TCP ACKs for previously transmitted outgoing data packets. Each TCP ACK may constitute an update to a TCP state machine of the socket. In turn, replication module 200, via a replication module kernel thread, fetches state information 254 including TCP state data (e.g., TCP state 76 and TCP state 76' of FIGS. 3-4) from socket 206A, prepares a composite message 256 including message 256A for transmitting the replicated data block and message 256B for the TCP state data, and then, sends composite message 256 as to the backup replication module in the standby node. In turn, the backup replication module reads the TCP state data and the replicated data block from the composite message and copies both pieces of data to the TCP socket. The replicated data block may be stored in a socket IO buffer such as socket send buffer or socket receive buffer. As a result, both the primary and standby nodes have an up-to-date TCP state.

Replication module 202 maintains send buffer 258 and receive buffer 260 for socket 206B, the backup socket for socket 206A. When the standby node receives composite message 256, replication module 202 extracts one or more data blocks from message 256A and maps each data block to a sequence number as defined in state information 254 for socket 206A. Replication module 202 stores each data block in send buffer 258 according to a corresponding sequence number. With respect to inbound data, replication module 202 maps each data block to a receive sequence number and stores that data block in receive buffer 260.

Figure 10:
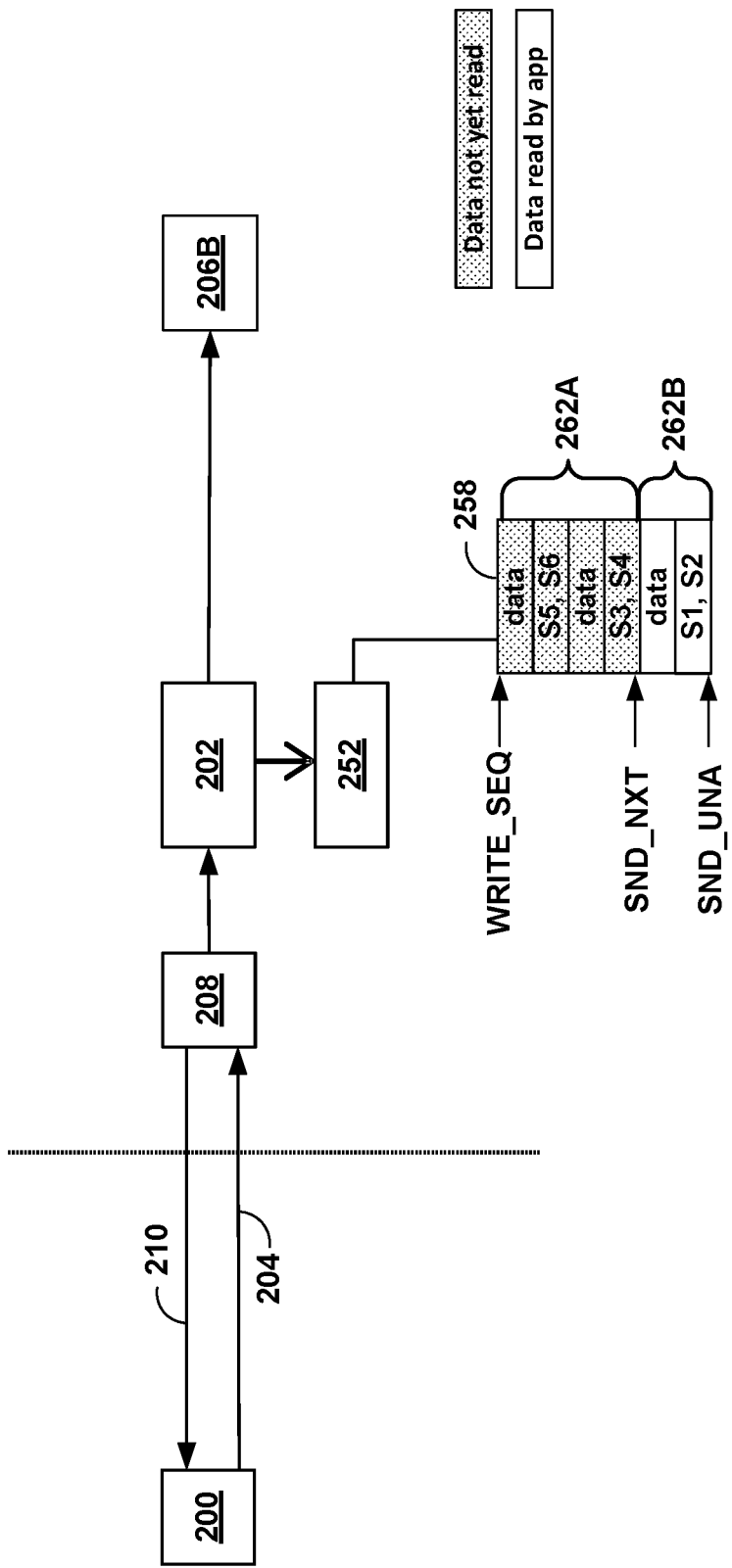
FIG. 10 is a conceptual diagram illustrating an example process for updating a state of a socket at a secondary routing engine according to the techniques of this disclosure.

FIG. 10 is a conceptual diagram illustrating an example process for updating a socket at a secondary routing engine according to the techniques of this disclosure.

Figure 11:
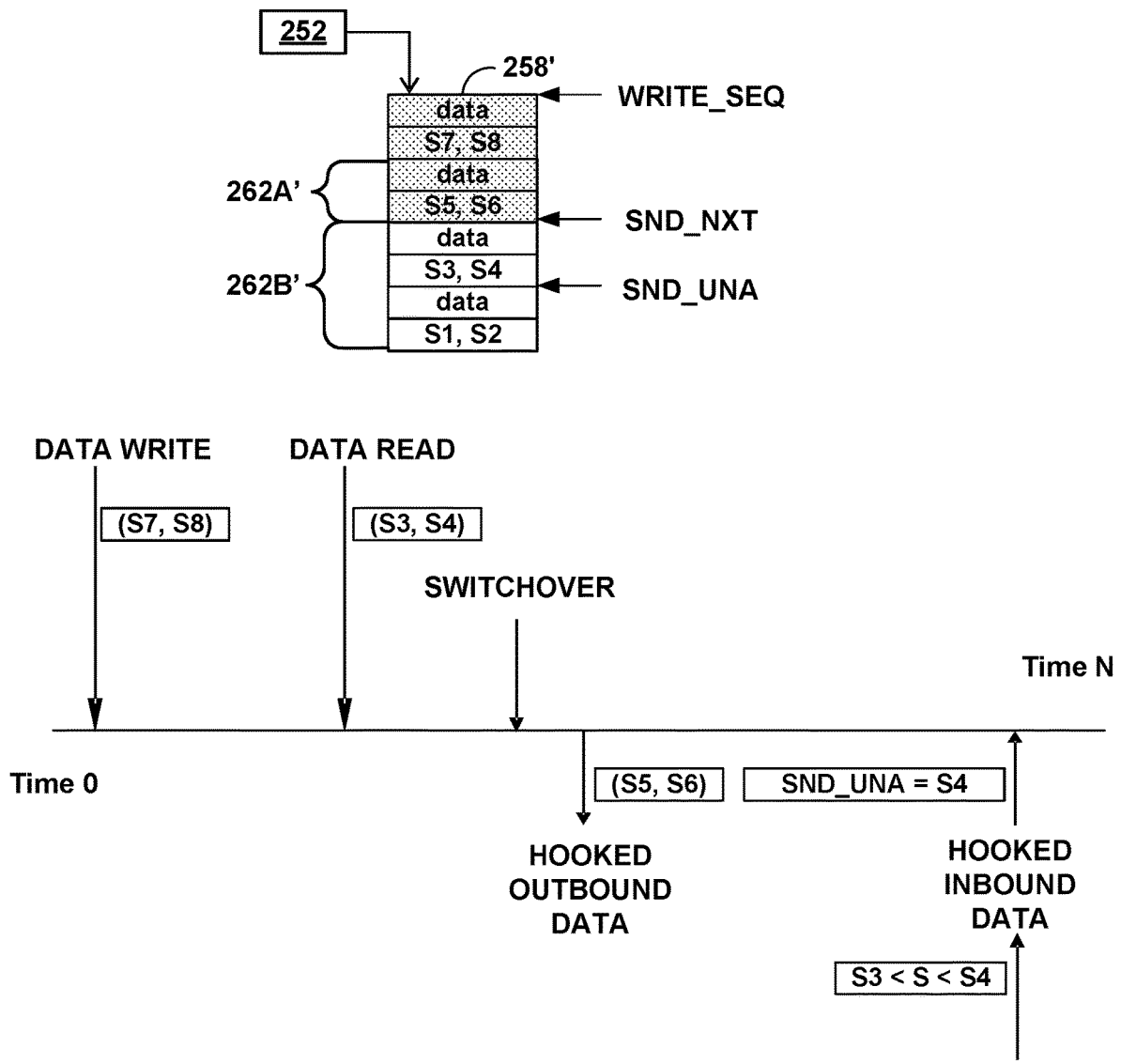
FIG. 11 is a conceptual diagram illustrating an example switchover from a primary routing engine to a secondary routing engine according to the techniques of this disclosure.

As illustrated in FIG. 10, send buffer 258 reflects a state of socket 206B before a TCP update message arrives (e.g., at either primary node or standby node). Replication module 200 may send the socket message, prompting replication module 202 to determine that the message includes a TCP ACK with sequence number "S2" and then, to update socket 206B by incrementing SND_UNA to "S3". In response to a data read operation for outbound data, replication module 202 removes a corresponding data block from the send buffer as soon as it is read by the application. The above replication module 202 operations result in send buffer 258' as illustrated in FIG. 11. The corresponding data block may map to a same sequence number as "S3" or "S4" in some examples. Hence, the application is not prevented from read requesting replicated data blocks in send buffer 258'.

Updating socket 206B, the backup socket for socket 206A, may include eavesdropping incoming and outgoing data units, removal of read data from send buffer, and correcting any mismatch between a last acknowledged data block and a last transmitted data block based on reception of TCP ACK. Similar to FIGS. 8-11, a standby node has replication module 202, send buffer 258, and a replication TCP socket, socket 208, over which replicated data and TCP state updates are communicated. In a primary node, a primary replication module fetches current/updated TCP state data and a replicated data block, prepares a composite message, and sends the composite message to the backup replication module in the standby node. The backup replication module in the standby node processes the composite message and updates a local copy of the TCP state. The composite message may be known as a TCP update message.

To illustrate by way of example, replication module 202 may receive an out-of-band IPC (socket) message storing a TCP ACK with a sequence number of "S4." Since the TCP update message has an ACK sequence number of S4 and each data block until sequence space S4 has been read by the application, replication module 202 removes the first two data blocks from send buffer 258. As a result, sequence space 262A points to a subsequence of data that is yet to be transmitted by either the primary node or (after a switchover) the standby node, and sequence space 262B points to a subsequence of data that is yet to be acknowledged by the peer. SND_NXT represents a first data block of space 262A and SND_UNA represents a first data block of space 262B. In the event of a switchover, if the standby node resumes the routing session at SND_NXT, the standby node does not retransmit any data, which may cause the standby node to lag behind the primary node (e.g., even when the primary node has a failure).

If a next TCP update message arrives and replication module 202 determines that the message includes a TCP ACK with sequence number "S6", the backup replication module removes a corresponding data block from the send buffer as soon as it is read by the application. The corresponding data block may map to a same sequence number as "S6" in some examples. Hence, the application is not prevented from read requesting replicated data blocks in the send buffer.

FIG. 11 is a conceptual diagram illustrating an example switchover from a primary routing engine to a secondary routing engine according to the techniques of this disclosure.

An example (eavesdropping) mechanism configured to support the example process may be a Netfilter (NF) hook whose operations are illustrated in FIG. 11 and described herein. The NF hook refers to a known hooked code section that notifies the standby node of outgoing/incoming packets.

After a write operation illustrated in FIG. 11, send buffer 258' includes data blocks having sequence numbers of "S7" and "S8." After a read operation, data blocks having sequence numbers of "S3" and "S4" are provided to a requesting application. Also illustrated in FIG. 11, send buffer 258' includes data to be transmitted after the switchover. A first block of this data is pointed to by SND_NXT. SND_NXT is a TCP state variable representing a byte-level sequence number for a first byte that a peer is next expecting to receive while SND_UNA is a TCP state variable representing an acknowledgement of a byte-level sequence number for a last byte that the primary node successfully transmitted. At this point, send buffer 258' has data blocks with sequence space "S1" to "S8", representing previously written data of which subsequence 262A' refers to untransmitted data and subsequence 262B' represents unacknowledged data.

In one example, one or more code elements of a protocol stack at a primary mode, hooked at IP_NET_LOCAL_OUT, receives TCP state data including a value for SND_NXT confirming that data blocks with sequence numbers "S3" and "S4" have been transmitted by the primary routing engine. As a result, SND_NXT is updated to a value of "S5" and subsequence 262A' is updated to reflect data blocks having sequence numbers "S5" and "S6" as the next data blocks to be transmitted by either the primary node or the standby node. Replication module 202 may remove data blocks having sequence numbers "S3" and "S4" from send buffer 258' because these data blocks have been sent.

When implemented at the standby node, replication module 202 manages instances where a TCP state of backup socket 206B may be inconsistent with replicated TCP segments. As one example, replication module 202 configures the NF hook to identify and then, correct differences between state data attributes SND_NXT and SND_UNA on backup socket 206B (post switchover).

After the switchover and based the value of SND_NXT, the standby node resumes the primary node's routing session, starting with the data blocks having sequence numbers corresponding to the SND_NXT. In one example, one or more code elements of a protocol stack at the standby mode, hooked at IP_NET_LOCAL_OUT, hooked outbound data including a TCP segment with one or more replicated data blocks and TCP state data. As illustrated, the TCP segment includes data blocks with sequence numbers "S5" and "S6". Replication module 202 may update the SND_NXT value to "S7" and record "S7" for the updated TCP state. The SND_NXT value may also be "S6" to represent a last transmitted data block.

Subsequently, the NF hook receives, at IP_NET_LOCAL_IN, hooked inbound data including a TCP segment with one or more replicated data blocks and TCP state data including an acknowledged sequence number for updating SND_UNA. The acknowledged sequence number may have a value of "S", which is greater than a SND_UNA with a value represented by "S3" and less than a SND_UNA with a value represented by "S4." The NF hook modifies the acknowledged sequence number in a header of the received TCP segment to include the value represented by "S4", checksums the modified header, and pushes the modified TCP segment up the protocol stack (e.g., to a next layer). Replication module 202 may update the SND_UNA to a value to represented as "S5" to represent a next data block after a last acknowledged data block in backup socket 206B's send buffer 258'.

Figure 12:
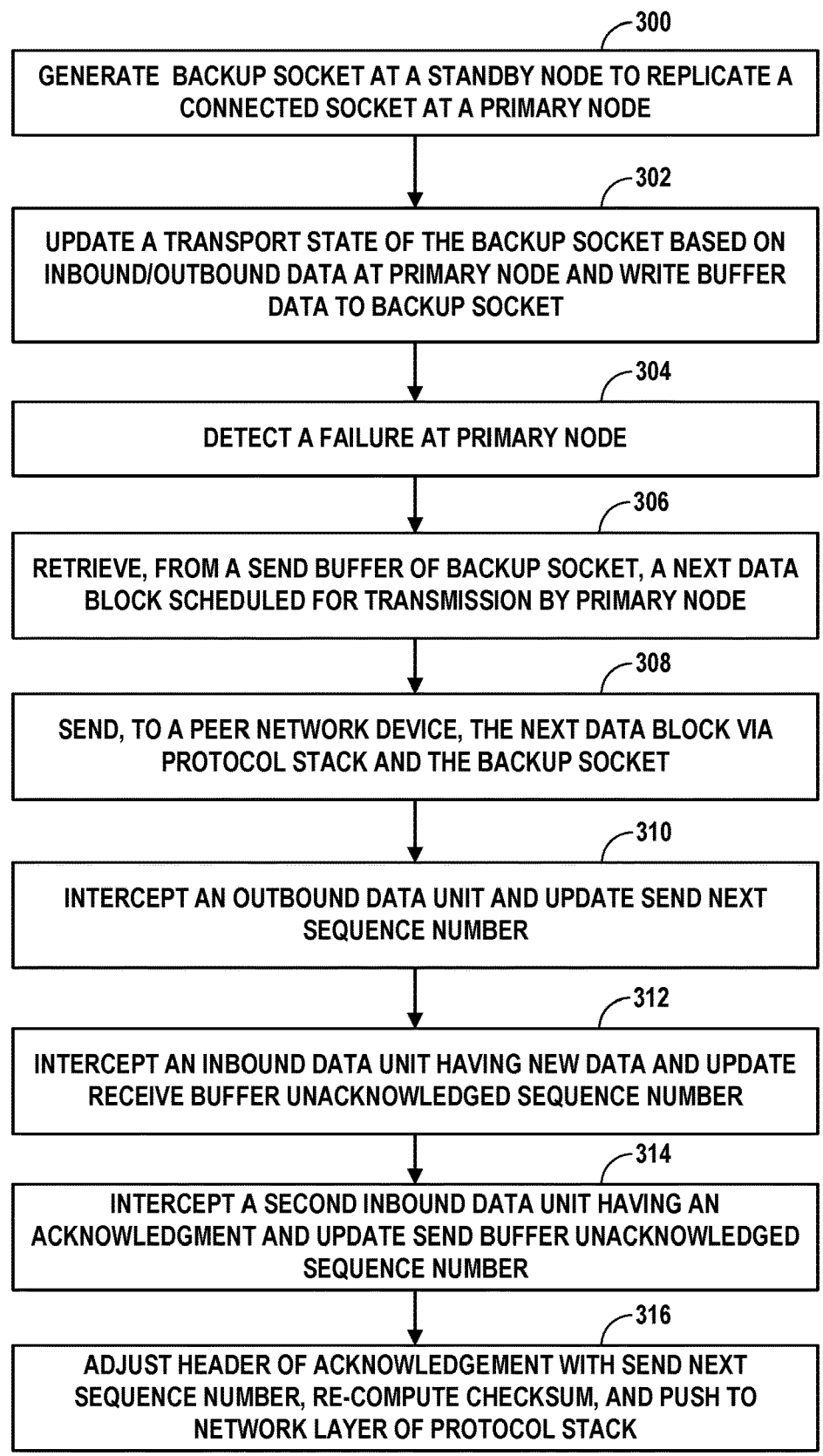
FIG. 12 is a flowchart illustrating an example method for non-stop routing after an example switchover from a primary routing engine to a secondary routing engine according to the techniques of this disclosure.

FIG. 12 is a flowchart illustrating an example method for non-stop routing after an example switchover from a primary routing engine to a secondary routing engine according to the techniques of this disclosure.

A network device, such as router 20 or router 21, may include one or more components that are instructed to replicate data (e.g., a socket) corresponding to a communication session (e.g., a routing session) with a peer network device. The network device may include a primary routing engine and a secondary routing engine or just a primary routing engine with a secondary routing engine running another network device. In either example, a replication module, such as replication module 12 or 14 of FIG. 5, of the network device executes the example method to prepare for and facilitate a switchover, for example, after a failure of the primary routing engine or the network device altogether.

Regardless of whether the primary and secondary routing engines are in separate devices or share a same device, in the following description, the primary routing engine and the secondary routing engine may be referred to as primary node and standby node, respectively. In this manner, the primary node or the standby node each represent a component of a network device or the entire network device.

The following describes the example method with respect to replication module 202 of FIGS. 8-11. Replication module 202, in accordance with socket replication practices, generates a backup socket, socket 206B, using information corresponding to a connected socket, socket 206A, at the primary node of the network (300). Replication module 202 receives example information including a transport layer state of the connected socket. As described herein, the connected socket at the primary node provides network communication connectivity between the primary node and a peer network device in accordance with a transport layer protocol. In event of a switchover from the primary node, the backup socket of the standby node is configured to provide network communication connectivity between the standby node and the peer network device.

Replication module 202 updates a transport layer state of the backup socket based on inbound/outbound data at the primary node and then, writes buffer data to the backup socket to store the inbound/outbound data (302). Replication module 202 may update the backup socket (e.g., with a current state of the connected socket). A receive buffer and a send buffer may store the inbound data (e.g., received data units) and the outbound data (e.g., both transmitted and non-transmitted data units), respectively. When the primary node prepares data (e.g., routing message data) for transmission, the primary node replicates that data to the standby node where replication module 202 stores in the send buffer one or more replicated data blocks and updates the backup socket (e.g., with a current state of the connected socket). When the primary node actually transmits the data, the primary node notifies the standby node and the replication module 202 propagates the notification by updating the backup socket (e.g., with a current state of the connected socket).

The standby node detects a failure at the primary node causing a switchover to the standby node (304), and in response, replication module 202 retrieves, from the send buffer of backup socket, a next data block scheduled for transmission by the primary node (306). It should be noted that the switchover may be invoked due to other reasons besides failure, including, but not limited to, an administrator-initiated switchover. The administrator may take primary node offline, for example, in order to perform maintenance and/or install updates. There may be additional reasons envisioned by the present disclosure. As described herein, the transport layer state of the backup socket indicates which data blocks of the send buffer have been transmitted but not yet acknowledged and which data blocks of the send buffer have been written to the connected socket but not yet transmitted by the primary node. Regarding the latter, replication module 202 identifies a first data block (e.g., a first sequence number) of the data blocks that have not been transmitted yet as the next data block to be sent to the peer network device. In some examples, the first data block is followed by a subsequence of data blocks scheduled for transmission at a next transmission time and therefore, the sequence number of that first data block is a starting point of the standby nodes resumption of the routing session.

Replication module 202 directs the network device to send, to the peer network device, the identified next data block via the backup socket (308). Similar to other applications in an application space or other kernel modules in a kernel space, replication module 202 generates a socket message with the identified next data block and then, pushes the socket message to a protocol stack. In general, the protocol stack through a number of layers applies appropriate networking protocols to the socket message. The protocol stack packages the socket message into a data unit according to a same transport layer protocol as the backup socket.

Replication module 202, by way of hooked code elements at the protocol stack, intercepts an outbound data unit and updates a send next sequence number (310). The send next sequence number refers to example state information for the transport layer state of the backup socket. The send next sequence number (e.g., SND_NXT) represents a next data block to be transmitted to the peer network device. Using a sequence number in the outbound data unit of a last transmitted data block, replication module 202 updates the send next sequence number to represents a new next data block to be transmitted to the peer network device. In some examples, replication module 202 increments the sequence number of the last transmitted data block (e.g., by one (1)).

Replication module 202, by way of the hooked code elements at the protocol stack, intercepts an inbound data unit having new data and then, updates a receive buffer unacknowledged sequence number. As another example of information for the transport layer state of the backup socket, the receive buffer unacknowledged sequence number represents a last acknowledged data block or a first unacknowledged data block. In either example, replication module 202 may use the inbound data unit to update the receive buffer unacknowledged sequence number and then, identify a current subsequence of unacknowledged data blocks.

Replication module 202, by way of the hooked code elements at the protocol stack, intercepts a second inbound data unit having an acknowledgment and then, updates a send buffer unacknowledged sequence number (314). For example, the acknowledgement may correspond to the transmitted outbound data unit send to the peer network device. As described herein, replication module 202 may not transmit data from the send buffer if that data has already been transmitted. Even if the data has not been acknowledged by the peer network device, retransmitting data may cause lagging and (at the worst) errors in the routing session.

Replication module 202 adjusts a header of the acknowledgement with the updated send next sequence number, re-computes checksum, and pushes the acknowledgment to network layer of the protocol stack (316). At this point, a state of the backup socket may indicate that the send buffer unacknowledged sequence number is equal to the send next sequence number. Replication module 202 may forego adjusting the acknowledgment if the send buffer unacknowledged sequence number matches the send next sequence number. If the send buffer unacknowledged sequence number is less than the send next sequence number, replication module 202 proceeds with the adjustment because, in this manner, other layers of the protocol stack may assume that at least one unacknowledged data block has been acknowledged.

In this manner, the techniques of this disclosure may address various issues related to socket data replication for, e.g., high availability. The techniques of this disclosure may be used in conjunction with open source operating system software, such as Linux, whose licensing terms prohibit modification of the operating system kernel. Because the kernel need not be modified, kernel versions can be upgraded periodically and relatively simply. The techniques of this disclosure may be applied when an operating system kernel is only available as a binary and not open source as well, because the kernel need not be modified and recompiled, since the techniques of this disclosure can be implemented using loadable modules. The techniques of this disclosure may allow applications to work with socket data replication without almost any change other than marking a socket to be replicated. These techniques may provide overall performance benefits in terms of reduced memory copy and number of system calls made, which would otherwise heavily impact the system in a scaled environment.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Example 1: An method includes receiving, by an protocol stack of an operating system for a standby node of a network device, a socket message via a first socket, the socket message comprising a representation of data to be written to a second socket and state information of a connected socket at a primary node of the network device, wherein the connected socket at the primary node provides network communication connectivity between the primary node and the peer network device, wherein the first socket provides network communication connectivity between the primary node and the standby node of the network device in accordance with transport protocol, wherein the standby node is configured to provide control for the network device after failure of the primary node, wherein the second socket provides network communication connectivity between the standby node and the peer network device after the failure of the primary node; in response to the socket message, sending, by the protocol stack of the standby node, a socket acknowledgement in accordance with the transport protocol, wherein after receiving the socket acknowledgement from the standby node, a primary replication module in the primary node sends the data to the peer network device via the connected socket; and updating, by a backup replication module, the second socket using the state information of the connected socket at the primary node.

Example 2: The method of example 1 further includes updating, by the backup replication module, routing information or forwarding information at the standby node using the data.

Example 3: The method of any of examples 1 and 2 further includes generating, by the backup replication module, the second socket as a backup socket for the connected socket at the primary node, wherein the second socket comprises a replicated state of the connected state.

Example 4: The method of any of examples 1 through 3, wherein the representation of data comprises a route advertisement message.

Example 5: The method of any of examples 1 through 4, wherein receiving the socket message comprises receiving, by a transport layer component of the protocol stack, a composite message comprising a first message and a second message, wherein the first message comprising the representation of data and the second message comprises the state information.

Example 6: The method of any of examples 1 through 5 further includes executing, by the operating system, at least one of a data write operation to store the data in a receive buffer of the second socket or a send buffer of the second socket or a data read operation to remove a portion from the receive buffer or the send buffer.

Example 7: The method of any of examples 1 through 6, wherein sending the socket acknowledgement comprises: receiving, by the protocol stack, a first data unit via the first socket in accordance with a transmission control protocol (TCP), wherein the first data unit comprises a header storing the state information and a payload storing the representation of data; and in response to the data unit, sending, by the protocol stack, a second data unit in accordance with TCP to the standby node, the second data unit comprising a TCP acknowledgement of the first data unit.

Example 8: The method of example 7, wherein sending the socket acknowledgement comprises after receiving the TCP acknowledgment in accordance with TCP from the protocol stack of the standby node, sending, by the primary replication module, a second TCP acknowledgement to a source of the first data unit.

Example 9: The method of any of examples 1 through 8, further comprising removing, by the backup replication module, a portion from a buffer of the second socket based on the state information in the socket message.

Example 10: The method of any of examples 1 through 9, further comprising in response to a switchover to the standby node, sending, by the operating system, data from a send buffer of the second socket to the peer network device via the second socket.

Example 11: The method of example 10, further includes retrieving, by the operating system, data from a receive buffer of the second socket; and sending, by the protocol stack, a second socket acknowledgment to the peer network device via the second socket.

Example 12: The method of example 11, further comprising forming, by the operating system, a packet including the data sent to the first socket or the data retrieved from the second socket.

Example 13: The method of any of examples 1 through 12, wherein the backup replication module is executed in at least one of a kernel space or a user space.

Example 14: The method of any of examples 1 through 13, wherein the representation of the data comprises: one or more operation flags as part of the representation of the data; a socket descriptor as part of the representation of the data; and buffer data identifying the data as part of the representation of the data.

Example 15: A network device includes a standby node configured to provide control for the network device after failure of a primary node, wherein standby node comprises one or more processors implemented in circuitry and configured to: execute an operating system to load a protocol stack operative to: receive a socket message via a first socket, wherein the socket message comprises a representation of data to be written to a second socket and state information of a connected socket at a primary node of the network device, wherein the first socket provides network communication connectivity between the primary node and the standby node of the network device in accordance with transport protocol, wherein the second socket provides network communication connectivity between the standby node of the network device and a peer network device in response to the failure, wherein the connected socket, wherein the connected socket at the primary node provides network communication connectivity between the primary node and the peer network device; and return, in response to the socket message, a socket acknowledgement in accordance with the transport protocol, wherein after receiving the socket acknowledgement from the standby node, a primary replication module in the primary node sends the data to the peer network device via the connected socket; and execute a replication module to: update the second socket using the state information of the connected socket at the primary node.

Example 15: The network device of any of examples 14 and 15, wherein the one or more processors implemented in circuitry are further configured to execute logic operative to receive, via the first socket, the socket message according to transmission control protocol (TCP) and to a send, via the second socket, the socket acknowledgment in accordance with transmission control protocol (TCP).

Example 16: The network device of any of examples 14 through 16, wherein the one or more processors are further configured to execute the replication module to remove, based on the state information, a portion of a send buffer or a portion of a receive buffer of the second socket.

Example 17: The network device of any of examples 14 through 17, wherein the one or more processors are further configured to execute the replication module in response to a switchover, the replication module being operative to: send data from a send buffer to the peer network device via the second socket.

Example 18: The network device of any of examples 14 through 18, wherein the one or more processors are further configured to execute the replication module to send the data to an application.

Example 19: The network device of any of examples 14 through 19 further comprising one or more second processors of the primary node configured to, after receiving the socket acknowledgement, execute a primary replication module to send the data to the peer network device or a second socket acknowledgement to a source.

Example 20: A computer-readable storage medium having stored thereon instructions that, when executed, cause one or more processors of a primary node of a network device to: execute an operating system to provide an application space and a kernel space; execute logic in the kernel space, the logic operative to: receive a socket message via a first socket, wherein the socket message comprises a representation of data to be written to a second socket and state information of a connected socket at a primary node of the network device, wherein the first socket provides network communication connectivity between the primary node and the standby node of the network device in accordance with transport protocol, wherein the second socket provides network communication connectivity between the standby node of the network device and a peer network device in response to the failure, wherein the connected socket, wherein the connected socket at the primary node provides network communication connectivity between the primary node and the peer network device; return, in response to the socket message, a socket acknowledgement in accordance with the transport protocol, wherein after receiving the socket acknowledgement from the standby node, a primary replication module in the primary node sends the data to the peer network device via the connected socket; and update the second socket using the state information of the connected socket at the primary node.

Example 21: A method includes receiving, by a replication module, a representation of data to be written to a first socket, wherein the first socket provides network communication connectivity between a primary node of the network device and a peer network device; sending, by the replication module, a socket message, via a second socket, to a standby node of the network device, wherein the socket message comprises state information of the first socket and the representation of data, wherein the second socket provides network communication connectivity between the primary node and the standby node in accordance with a transport protocol, wherein the standby node is configured to provide control for the network device after failure of the primary node; in response to the socket message, sending, by a protocol stack of the standby node, a socket acknowledgement in accordance with the transport protocol; and after receiving the socket acknowledgement from the standby node, sending, by the replication module, the data to the peer network device via the first socket.

Example 22: The method of any of examples 1 through 22, wherein the replication module is executed in at least one of a kernel space or a user space.

Example 23: The method of any of examples 1 through 23, wherein the representation of data comprises a route advertisement message.

Example 24: The method of any of examples 1 through 24, wherein sending, by the replication module, the socket message comprises creating, by the replication module, a composite message comprising a first message and a second message, wherein the first message comprising the representation of data and the second message comprises the state information.

Example 25: The method of any of examples 1 through 25, further comprising forming the representation of the data, wherein forming the representation of the data comprises: generating one or more operation flags as part of the representation of the data; generating a socket descriptor as part of the representation of the data; and generating buffer data identifying the data as part of the representation of the data.

Example 26: The method of any of examples 1 through 26 further includes retrieving, by the replication module, second data of a data unit via the first socket in accordance with a transmission control protocol (TCP); and sending, by an operating system of the primary node, a second data unit in accordance with TCP to the standby node, the socket message comprising a copy of the second data.

Example 27: The method of any of examples 6 through 27 further comprising after receiving a second socket acknowledgment in accordance with TCP from the protocol stack of the standby node, sending, by the operating system, a third socket acknowledgment in accordance with TCP to a source of the data unit via the first socket.

Example 28: The method of any of examples 1 through 28, further comprising removing, by the replication module, a portion from a buffer of the second socket in response to an acknowledgment from a second replication module of the standby node.

Example 29: The method of any of examples 1 through 29, further comprising forming, by the operating system, a packet including the data sent to the second socket.

Example 30: The method of any of examples 1 through 30, wherein based on the state information, a second replication module of the standby node removes a portion of a send buffer or a portion of a receive buffer of a replicated socket, wherein the replicated socket is configured for network communication connectivity between the standby node and the peer network device.

Example 31: The method of any of examples 30 and 31, further comprising, in response to a switchover to the standby node: sending, by an operating system of the standby node, data from the send buffer to the peer network device via the replicated socket; and retrieving, by the operating system, data from the receive buffer of the replicated buffer.

Example 32: A network device includes a primary node; and a standby node configured to provide control for the network device after failure of the primary node, wherein primary node comprises one or more processors implemented in circuitry and configured to: execute a replication module to: receive a representation of data to be written to a first socket, wherein the first socket provides network communication connectivity between the primary node of the network device and a peer network device; and send a socket message, via a second socket, to a standby node of the network device, wherein the socket message comprises state information of the first socket and the representation of data, wherein the second socket provides network communication connectivity between the primary node and the standby node in accordance with a transport protocol, wherein the standby node is further configured to return, in response to the socket message, a socket acknowledgment in accordance with the transport protocol; and after receiving the socket acknowledgement from the standby node, send the data to the peer network device via the first socket.

Example 33: The network device of any of examples 32 and 33, wherein the replication module is further operative to execute an operating system to provide an application space and a kernel space, wherein the replication module is executed in at least one of the application space and the kernel space.

Example 34: The network device of any of examples 32 through 34, wherein the standby node comprises one or more processors implemented in circuitry and configured to execute logic operative to send, in response to a send, via the second socket, the socket acknowledgment in accordance with transmission control protocol (TCP).

Example 35: The network device of any of examples 32 through 35, wherein the standby node comprises one or more processors implemented in circuitry and configured to execute a second replication module to remove, based on the state information, a portion of a send buffer or a portion of a receive buffer of a replicated socket, wherein the replicated socket is configured for network communication connectivity between the standby node and the peer network device.

Example 36: The network device of any of examples 35 and 36, wherein the one or more processors are further configured to execute the replication module to send data from the send buffer to the peer network device via the replicated socket; and retrieve data from the receive buffer of the replicated buffer.

Example 37: The network device of any of examples 32 through 37, wherein the one or more processors are configured to send the representation of the data to the standby node according to transmission control protocol (TCP) and to receive the acknowledgement from the standby node according to TCP.

Example 38: The network device of any of examples 32 through 38, wherein the one or more processors are further configured to execute the replication module to retrieve second data of a received packet from the first socket, send the second data to the standby node, and after receiving a second socket acknowledgement from the standby node, send the second data to an application.

Example 39: The network device of any of examples 38 and 39, wherein the one or more processors are further configured to, after receiving the second socket acknowledgement, execute the replication module to send a third socket acknowledgement of the received packet to a source of the received packet.

Example 40: A computer-readable storage medium having stored thereon instructions that, when executed, cause one or more processors of a primary node of a network device to: execute an operating system to provide an application space and a kernel space; execute a replication application in the application space to receive a write function call including data to be written to a socket of the operating system and to send a representation of the data to a replication module executed in the kernel space; and execute the replication module to send the representation of the data to a standby node of the network device and, after receiving an acknowledgement from the standby node, to send the data to the socket.

Various examples have been described. These and other examples are within the scope of the following claims.

What is claimed is:

1. A method comprising:
receiving, by a replication module of a primary node in a network, a representation of data to be written to a first socket, the data including a series of data blocks, wherein the first socket provides network communication connectivity between the primary node and a peer network device;
sending, by the replication module, a socket message, via a second socket, to a standby node in the network, wherein the socket message comprises transport layer state information of the first socket and the representation of the data, wherein the second socket provides network communication connectivity between the primary node and the standby node in accordance with a transport layer protocol, wherein the standby node is configured to provide network communication connectivity between the standby node and the peer network device in response to a switchover from the primary node and wherein the transport layer state information includes information identifying the series of data blocks as blocks that have not yet been acknowledged by the peer network device as of a time of the switchover;
receiving, by the replication module, from the standby node, a socket acknowledgement in accordance with the transport layer protocol; and
in response to receiving the socket acknowledgement from the standby node, sending, by the replication module, the data to the peer network device via the first socket.

2. The method of claim 1, wherein the replication module is executed in at least one of a kernel space or a user space.

3. The method of claim 1, wherein the representation of the data comprises a route advertisement message.

4. The method of claim 1, wherein sending, by the replication module, the socket message comprises creating, by the replication module, a composite message comprising a first message and a second message, wherein the first message comprises the representation of the data and the second message comprises the state information.

5. The method of claim 1, further comprising forming the representation of the data, wherein forming the representation of the data comprises:
generating one or more operation flags as part of the representation of the data;
generating a socket descriptor as part of the representation of the data; and
generating buffer data identifying the data as part of the representation of the data.

6. The method of claim 1 further comprising:
receiving, by the replication module, second data of a data unit from the peer network device via the first socket, the second data including an acknowledgement of the series of data blocks;
generating, by the replication module, a second socket message including second transport layer state information of the first socket, the second transport layer state information including information identifying the series of data blocks as blocks that have been acknowledged by the peer network device as of the time of the switchover;
sending, by the replication module, the second socket message to the standby node via the second socket; and
delivering the second data to a network application before receiving a second socket acknowledgement of the second socket message from the standby node.

7. The method of claim 6 further comprising, after receiving the second socket acknowledgment from of the standby node, sending a third socket acknowledgment to the peer network device via the first socket.

8. The method of claim 6, wherein the second socket message represents an instruction to the standby node to remove a portion of a send buffer of a replicated socket corresponding to the series of data blocks from the send buffer.

9. The method of claim 1, further comprising forming, by an operating system of the primary node, a packet including at least a portion of the series of data blocks.

10. A network system comprising a primary node comprising one or more processors implemented in circuitry and configured to execute a replication module to:
receive a representation of data to be written to a first socket, the data including a series of data blocks, wherein the first socket provides network communication connectivity between the primary node and a peer network device;
send a socket message, via a second socket, to a standby node in the network, wherein the socket message comprises transport layer state information of the first socket and the representation of the data, wherein the second socket provides network communication connectivity between the primary node and the standby node in accordance with a transport layer protocol, wherein the standby node is configured to provide network communication connectivity between the standby node and the peer network device in response to a switchover from the primary node, and wherein the transport layer state information includes information identifying the series of data blocks as blocks that have not yet been acknowledged by the peer network device as of a time of the switchover;
receive, from the standby node, a socket acknowledgement in accordance with the transport layer protocol; and
in response to receiving the socket acknowledgement from the standby node, send the data to the peer network device via the first socket.

11. The network system of claim 10, wherein the one or more processors are configured to execute an operating system to provide an application space and a kernel space, wherein the replication module is executed in at least one of the application space or the kernel space.

12. The network system of claim 10, wherein the one or more processors are configured to send the representation of the data to the standby node according to transmission control protocol (TCP) and to receive the acknowledgement from the standby node according to TCP.

13. The network system of claim 10, wherein the one or more processors are further configured to execute the replication module to:
receive second data of a data unit from the peer network device via the first socket, the second data including an acknowledgement of the series of data blocks;
generate a second socket message including second transport layer state information of the first socket, the second transport layer state information including information identifying the series of data blocks as blocks that have been acknowledged by the peer network as of the time of the switchover;
send the second socket message to the standby node via the second socket; and
deliver the second data to a network application before receiving a second socket acknowledgement of the second socket message from the standby node.

14. The network system of claim 13, wherein the one or more processors are further configured to, after receiving the second socket acknowledgement, execute the replication module to send a third socket acknowledgement of the received packet to the peer network via the first socket.

15. A computer-readable storage medium having stored thereon instructions that, when executed, cause a processor of a primary node in a network to execute a replication module to:
receive a representation of data to be written to a first socket, the data including a series of data blocks, wherein the first socket provides network communication connectivity between the primary node and a peer network device;
send, by the replication module, a socket message, via a second socket, to a standby node in the network, wherein the socket message comprises transport layer state information of the first socket and the representation of the data, wherein the second socket provides network communication connectivity between the primary node and the standby node in accordance with a transport layer protocol, wherein the standby node is configured to provide network communication connectivity between the standby node and the peer network device in response to a switchover from the primary node, and wherein the transport layer state information includes information identifying the series of data blocks as blocks that have not yet been acknowledged by the peer network device as of a time of the switchover;
receive, from the standby node, a socket acknowledgement in accordance with the transport layer protocol; and
in response to receiving the socket acknowledgement from the standby node, sending, by the replication module, the data to the peer network device via the first socket.

16. The computer-readable storage medium of claim 15, wherein the replication module is executed in at least one of a kernel space or a user space.

17. The computer-readable storage medium of claim 15, further comprising: instructions that cause the processor to execute the replication module to:
receive second data of a data unit from the peer network device via the first socket, the second data including an acknowledgement of the series of data blocks;
generate, by the replication module, a second socket message including second transport layer state information of the first socket, the second transport layer state information including information identifying the series of data blocks as blocks that have been acknowledged by the peer network device as of the time of the switchover; and
send the second socket message to the standby node via the second socket; and instructions that cause the processor to deliver the second data to a network application before receiving a second socket acknowledgement of the second socket message from the standby node.

* * * * *